US006301579B1

(12) United States Patent
Becker

(10) Patent No.: US 6,301,579 B1
(45) Date of Patent: Oct. 9, 2001

(54) METHOD, SYSTEM, AND COMPUTER PROGRAM PRODUCT FOR VISUALIZING A DATA STRUCTURE

(75) Inventor: Barry G. Becker, Mountain View, CA (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/175,318

(22) Filed: Oct. 20, 1998

(51) Int. Cl.[7] ................................................ G06F 17/30
(52) U.S. Cl. ........................... 707/102; 707/104; 345/440
(58) Field of Search ................................. 707/102, 104; 345/112, 133, 418, 420, 440

(56) References Cited

U.S. PATENT DOCUMENTS

| | | | |
|---|---|---|---|
| 3,816,726 | 6/1974 | Sutherland et al. | 345/524 |
| 4,719,571 | 1/1988 | Rissanen et al. | 364/300 |
| 4,807,158 | 2/1989 | Blanton et al. | 364/521 |
| 4,868,771 | 9/1989 | Quick et al. | 364/578 |
| 4,928,247 | 5/1990 | Doyle et al. | 395/160 |
| 4,994,989 | 2/1991 | Usami et al. | 395/120 |
| 5,043,920 | 8/1991 | Malm et al. | 395/119 |
| 5,072,395 | 12/1991 | Bliss et al. | 364/443 |
| 5,150,457 | 9/1992 | Behm et al. | 395/120 |
| 5,164,904 | 11/1992 | Sumner | 364/436 |
| 5,201,047 | 4/1993 | Maki et al. | 395/600 |
| 5,228,119 | 7/1993 | Mihalisin et al. | 395/118 |
| 5,247,666 | 9/1993 | Buckwold | 395/600 |
| 5,251,131 | 10/1993 | Masand et al. | 364/419.08 |
| 5,253,333 | 10/1993 | Abe | 395/62 |
| 5,282,262 | 1/1994 | Kurashige | 395/126 |
| 5,295,243 | 3/1994 | Robertson et al. | 395/160 |
| 5,303,388 | 4/1994 | Kreitman et al. | 395/159 |
| 5,307,456 | 4/1994 | MacKay | 395/154 |
| 5,325,445 | 6/1994 | Herbert | 382/38 |
| 5,418,946 | 5/1995 | Mori | 395/600 |
| 5,420,968 | 5/1995 | Johri | 395/133 |
| 5,426,780 | 6/1995 | Gerull et al. | 395/600 |
| 5,459,829 | 10/1995 | Doi et al. | 395/152 |

(List continued on next page.)

OTHER PUBLICATIONS

"A Dozen Companies on the Rise," http://www.dbpd.com/seconddz.htm, pp. 1–9, (Miller Freeman Inc. 1997).
"A Map for All Reasons", advertisement, Strategic Mapping, Inc., San Jose, CA 95117 (page and date unknown).
Aha, D.W. et al., "Instance–Based Learning Algorithms," *Machine Learning*, vol. 6, No. 1, pp. 37–66 (Jan. 1991).

(List continued on next page.)

Primary Examiner—Thomas Black
Assistant Examiner—Uyen Le
(74) Attorney, Agent, or Firm—Sterne, Kessler, Goldstein & Fox, P.L.L.C.

(57) ABSTRACT

A data structure visualization tool visualizes a data structure such as a decision table classifier. A data file based on a data set of relational data is stored as a relational table, where each row represents an aggregate of all the records for each combination of values of the attributes used. Once loaded into memory, an inducer is used to construct a hierarchy of levels, called a decision table classifier, where each successive level in the hierarchy has two fewer attributes. Besides a column for each attribute, there is a column for the record count (or more generally, sum of record weights), and a column containing a vector of probabilities (each probability gives the proportion of records in each class). Finally, at the top-most level, a single row represents all the data. The decision table classifier is then passed to the visualization tool for display and the decision table classifier is visualized. By building a representative scene graph adaptively, the visualization application never loads the whole data set into memory. Interactive techniques, such as drill-down and drill-through are used view further levels of detail or to retrieve some subset of the original data. The decision table visualizer helps a user understand the importance of specific attribute values for classification.

20 Claims, 22 Drawing Sheets

U.S. PATENT DOCUMENTS

| | | | |
|---|---|---|---|
| 5,463,773 | 10/1995 | Sakakibara et al. | 395/600 |
| 5,467,444 | 11/1995 | Kawamura et al. | 395/141 |
| 5,479,597 | 12/1995 | Fellous | 395/154 |
| 5,515,486 | 5/1996 | Amro et al. | 395/137 |
| 5,519,865 | 5/1996 | Kondo et al. | 395/600 |
| 5,528,735 | 6/1996 | Strasnick et al. | 395/127 |
| 5,680,476 | 10/1997 | Schmidt et al. | 382/159 |
| 5,694,524 | 12/1997 | Evans | 395/77 |
| 5,696,964 | 12/1997 | Cox et al. | 395/605 |
| 5,701,466 | * 12/1997 | Yong et al. | 707/100 |
| 5,546,529 | 8/1996 | Bowers et al. | 395/159 |
| 5,553,163 | 9/1996 | Nivelle | 382/227 |
| 5,555,354 | 9/1996 | Strasnick et al. | 395/127 |
| 5,604,821 | 2/1997 | Ranganathan et al. | 382/236 |
| 5,634,087 | 5/1997 | Mammone et al. | 395/24 |
| 5,659,731 | 8/1997 | Gustafson | 395/604 |
| 5,671,333 | 9/1997 | Catlett et al. | 395/20 |
| 5,671,381 | 9/1997 | Strasnick et al. | 395/355 |
| 5,675,711 | 10/1997 | Kephart et al. | 395/22 |
| 5,675,785 | 10/1997 | Hall et al. | 395/613 |
| 5,675,786 | 10/1997 | McKee et al. | 395/614 |
| 5,678,015 | 10/1997 | Goh | 395/355 |
| 5,706,495 | 1/1998 | Chadha et al. | 395/602 |
| 5,724,573 | 3/1998 | Agrawal et al. | 395/606 |
| 5,727,199 | 3/1998 | Chen et al. | 395/606 |
| 5,732,230 | 3/1998 | Cullen et al. | 395/339 |
| 5,737,487 | 4/1998 | Bellegarda et al. | 395/25.9 |
| 5,748,852 | 5/1998 | Mahler | 395/61 |
| 5,787,274 | 7/1998 | Agrawal et al. | 395/613 |
| 5,861,891 | 1/1999 | Becker | 345/433 |
| 5,864,839 | * 1/1999 | Bourgoin | 707/1 |
| 5,877,775 | 3/1999 | Theisen et al. | 345/440 |
| 5,896,139 | * 4/1999 | Strauss | 345/440 |
| 5,930,803 | 7/1999 | Becker et al. | 707/104 |
| 5,960,435 | 9/1999 | Rathmann et al. | 707/101 |
| 6,004,134 | * 12/1999 | Marcus et al. | 434/45 |
| 6,026,399 | * 2/2000 | Kohavi et al. | 707/6 |
| 6,075,530 | * 6/2000 | Lucas et al. | 345/339 |

OTHER PUBLICATIONS

Ahlberg et al., "IVEE: An Information Visualization & Exploration Environment, " Proceedings of Information Visualization '95, 1995, pp. 66–73.

Alexander, M., "Visualizing Cleared–Off Desktops", *Computerworld 25* (*18*), May 6, 1991, p. 20.

Alexander, Michael, "GIS Sprouting Corporate Wings", *Computerworld*, Jul. 22, 1991, p. 20.

Almuallim, H. and Dietterich, T.G., "Learning Boolean Concepts in the Presence of Many Irrelevant Features," *Artificial Intellignece*, vol. 69, Nos. 1–2, pp. 279–305 (Sep. 1994).

"Angoss Software's KnowledgeSeeker(™) Compatible with SAS Institute," http://www.newswire.ca/releases/September1997/18/c3915.html, pp. 122, Canada Newswire, Sep. 1997.

"Angoss Software Announces Knowledge Studio Data Mining Solution," http://www.pathfinder.com/@@xIEk0gYAVjbJZjKM/money/latest/pressPW/1997Oct27/92, Angoss Software Corporation, pp. 1–2, Oct. 1997.

Anthes, G.H., "GIS Eases Redistricting Worry", *Computerworld*, Oct. 7, 1991, p. 65.

"Atlas Software: A New Dimension in Data Management", advertisement, Atlas Software, Strategic Mapping, Inc., San Jose, CA 95117 (page and date unknown).

Becker et al., "Unsteady Flow Volumes," *Proceedings of Visualization '95*, pp. 329–335, 1995.

Becker et al., "Smooth Transitions between Bump Rendering Algorithms," *Computer Graphics Proceedings*, Annual Conference Series, 1993, pp. 183–190.

Benedikt, M., ed., *Cyberspace First Steps*, The MIT Press, Cambridge, Massachusetts (1992), pp. 1–436.

Beveaux, T., "Virtual Reality Gets Real", *New Media*, (Jan. 1993), pp. 32–35.

Blinn, James F., "Light Reflection Functions for Simulation of Clouds and Dusty Surfaces," *Computer Graphics*, vol. 16, No. 3, Jul. 1982, pp. 116–124.

Boyl, J. et al., "Design of a 3D user interface to a database," submitted to Database Issues for Data Visualization Workshop, Jul., 1993, pp. 1–9.

Breiman et al., *Classification and Regression Trees*, Wadsworth International Group, entire book (1984).

Carlbom et al., "A Hierarchical Data Structure for Representing the Spatial Decomposition of 3–D Objects", *IEEE Computer Graphics & Applications*, Apr. 1985, pp. 24–31.

Carlbom et al., "Planar Geometric Projections and Viewing Transformation" *Computing Surveys*, vol. 10, No. 4, Dec. 1978, pp. 465–502.

Cestnik, B., "Estimating Probabilities: A Crucial Task in Machine Learning," *Proceedings of the 9th European Conference on Artificial Intelligence*, pp. 147–149 (Aug. 1990).

Clarkson, Mark, A., "An Easier Interface", *BYTE*, Feb. 1991, pp. 277–282.

"Companies in Data Mining and Knowledge Discovery," http://kdnuggets.com/companies.html, p. 4, Last updated: Oct. 31, 1997.

Cormen, T.H., et al., *Introduction to Algorithms*, The MIT Press, pp. 263–280 (1990).

Cover and Thomas, *Elements of Information Theory*, Wiley Interscience, entire book 1991.

Crawfis et al., "Vector Field Visualiation," *Computer Graphics and Applications*, vol. 14, pp. 50–56, 1994.

Crawfis et al., "Texture Splats for 3D Scalar and Vector Field Visualization," *Proceedings of IEEE Visualization '93*, 1993, pp. 261–265.

Dasarathy, B.V., "Nearest Neighbor (NN) Norms: (NN) Patterns Classification Techniques," (IBL), *IEEE Computer Society Press*, pp. 1–30 (1990).

"Data Mining and Knowledge Discovery References," http://kdnuggets.com/references.html, pp. 1–3, Last updated: Oct. 29, 1997.

Domingos, P. and Pazzani, M., "Beyond Independence: Conditions for the Optimality of the Simple Bayesian Classifier," *Machine Learning: Proceedings of the 13th International Conference* (ICML '96), pp. 105–112 (1996).

Duda, R. and Hart, P., *Pattern Classification and Scene Analysis*, Wiley, entire book, (1973).

Fairchild, Kim M., Steven E. Poltrock and George W. Furnas, "SemNet: Three–Dimensional Graphic Representations of Large Knowledge Bases", *Cognitive Science and its Applications for Human–Computer Interaction*, Guindon, Ed., 1988, pp. 201–233.

Fairchild, K.M., "Information Management Using Virtual Reality–Based Visualizations," *Virtual Reality Applications and Explorations*, ed. A. Wexelblat, Academic Press, Inc., pp. 45–74, Copyright (1993), Publication date Jul. 1, 1993.

Fisher, R.A., "The use of multiple measurements in taxonomic problems," *Annals of Eugenics*, vol. 7., No. 1, pp. 179–188 (1936).

Flanagan, William G., "Cyberspace Meets Wall Street", *Forbes,* Jun. 22, 1992, pp. 164–168.

Foley et al., "Computer Graphics: Principals and Practice", Second Edition, Addison–Wesley Publishing Co., 1990, pp. 731–734 and color plate III.23.

Forrest, D., "Seeing Data in New Ways", *Computerworld,* Jun. 29, 1992, pp. 85–86.

Friedman, J. H. et al., "Lazy Decision Trees," *Proceedings of the Thirteenth National Conference on Artificial Intelligence,* AAAI Press and the MIT Press, vol. 1, pp. 717–724 (1996).

Fuller, J.E., Using Autocad, 3d Ed., Chapter 17, *Viewing 3–D Drawings,* 1989, pp. 17–1–17–14, and Tutorial, pp. 19–15–19–16, Delmar Publishers, Inc., Albany, NY 12212.

Gershon, N. et al., "Visualization's New Tack: Making Sense of Information," IEEE Spectrum, Nov., 1995, pp. 38–47 and 55.

Good, I.J., *The Estimation of Probabilities: An Essay on Modern Bayesian Methods,* pp. xi–xii, MIT Press, pp. 1–79, (1965).

Graves, G.L., "NASA's Virtual Reality", *New Media,* (Jan. 1993), pp. 36–38.

Graves, G.L., "Invasion of the Digital Puppets" *New Media,* (Jan. 1993), pp. 38–40.

Greenwood, J., "Countdown to the Cybermarket," Financial Post Magazine, Mar., 1994, pp. 26–32.

Grinstein, G. et al., "Visualization for Knowledge Discovery", *Intl. J. Intelligent Systems 7,* 1992, pp. 637–648.

Hilderbrand, Carol, "GIS Vital in Utility's Duel with Competitor", *Computerworld,* Jan. 20, 1992, p. 43.

"IBM Digs Deep for Data Mining 'Gold'," http://www.software.ibm.com/data/intelli–mine/factsheet.html, pp. 1–8, IBM Corporation, Copyrights 1997.

Inselberg et al., "Parallel Coordinates: A Tool for Visualizating Multidimensional Geometry," *Proceedings of Visualization '90,* pp. 361–378, 1990.

Jacobson, Bob, "The Ultimate User Interface", *BYTE,* April 1992, pp. 175–182.

Johnson, Brian and Ben Shneiderman, "Tree–Maps: A Space–Filling Approach to the Visualization of Hierarchical Information Structures", *IEEE Visualization Proceedings '91,* Oct. 1991, pp. 284–291.

"KD Mine: Data Mining and Knowledge Discovery," http://kdnuggets.com/index_kdm.html, p. 1, Knowledge Discovery Nuggets, Copyright 1997, Last updated: Oct. 31, 1997.

Kittler, J., "Feature Selection and Extraction," *Handbook of Pattern Recognition and Image Processing,* Chapter 3, pp. 59–83, Academic Press, Inc., 1986.

Knuth, A., *The Art of Computer Programming,* Addison-–Wesley, vol. 2, pp. 506–550 (1973).

Kohavi, R., "A Study of Cross–Validation and Bootstrap for Accuracy Estimation and Model Selection," *Proceedings of the 14th International Joint Conference on Artifical Intelligence,* Stanford University, 1995.

Kohavi, R. and Sommerfield, D., "Feature Subset Selection Using the Wrapper Model: Overfitting and Dynamic Search Space Topology," *Proceedings of the First International Conference on Knowledge Discovery and Data Mining,* pp. 192–197 (Aug. 1995).

Kohavi, R. and Li, C., "Oblivious Decision Trees, Graphs, and Top–Down Pruning," *Proceedings of the 14th International Joint Conference on Artificial Intelligence,* Chriss S. Mellish (Ed.), Morgan Kaufmann Publishers, Inc., pp. 1071–1077 (1995).

Kohavi, R., "Scaling Up the Accuracy of Naive–Bayes Classifiers: a Decision–Tree Hybrid," in *Data Mining and Visualization,* Silicon Graphics, Inc., from The Second International Conference on Knowledge Discovery and Data Mining (1996).

Kohavi, R. and John, G., "Wrappers for Feature Subset Selection," http://robotics.stanford.edu/~{ronnyk,gjohn}, May 20, 1997.

Kohavi, R. et al., "Data Mining using MLC++: A Machine Learning Library in C++, " *Tools With AI,* pp. 234–245 (1996).

Kononenko, I., "Inductive and Bayesian Learning in Medical Diagnosis," *Applied Artificial Intelligence,* vol. 7, pp. 317–337 (1993).

Langley, P. and Sage, S., "Oblivious Decision Trees and Abstract Cases," *Working Notes of the AAAI–94 Workshop on Case–Based Reasoning,* AAAI Press, pp. 113–117 (1994).

Langley, P., et al., "An Analysis of Bayesian Classifiers," *Proceedings of the Tenth National Conference on Artificial Intelligence,* pp. 223–228 (Jul. 1992).

Langley, P. and Sage, S., "Induction of Selective Bayesian Classifiers," *Proceedings of the Tenth Conference on Uncertainty in Artificial Intelligence,* Morgan Kaufmann Publishers, Inc., pp. 399–406 (Jul. 1994).

Laur et al., "Hierarchical Splatting: A Progressive Refinement Algorithm for Volume Rendering," *Computer Graphics,* vol. 25, No. 4, Jul. 1991, pp. 285–288.

Levoy, Marc, "Volume Rendering: Display of Surfaces from Volume Data," *IEEE Xomputer Graphics and Applications,* vol. 8, No. 5, May 1988, pp. 29–37.

Lincoff, G., *National Audubon Society Field Guide to North American Mushrooms,* New York, pp. 9–32, (1981).

Mangasarian, O. L. and Wolberg, W. H., "Cancer Diagnosis Via Linear Programming," *SIAM News,* vol. 23, No. 5, pp. 1&18 (Sep. 1990).

Martin et al., "High Dimensional Brushing for Interactive Exploration of Multivariate Data," *Proceedings of Visualization '95,* 1995, pp. 271–278.

Max et al., "Flow Volumes for Interactive Vector Field Visualization," *Proceedings of Visualization '93,* 1993, pp. 19–24.

Max et al., "Bump Shading for Volume Textures," *IEEE Computer Graphics and Applications,* Jul. 1994, 18–20.

Michie, et al., *Machine Learning , Neural and Statistical Classification,* Ellis Norwood United, entire book, (1994).

"MineSet 2.0 for Data Mining and Multidimensional Data Analysis," by C. Hall, http://www.sgi.com/Products/software/MineSet/DMStrategies/, pp. 1–12, (1997). (originally appeared in Sep. 1997 issue of *DATA Management Strategies,* Copyright 1997 Cutter Information Corp.).

"Mineset Awards," http://www.sgi.com/Products/software/MineSet/awards.html, p. 1, (Jan. 9, 1998).

MineSet User's Guide, Silicon Graphics Computer Systems, 1996, made available to public less than one year prior to Jan. 13, 1997.

Murthy, S. et al., "Randomized induction of oblique decision trees," *Proceedings of the Eleventh National Conference on Artificial Intelligence,* AAI Press/MIT Press, pp. 322–327 (1993).

Newquist, H.P., "Virtual Reality's Commercial Reality", *Computerworld 26 (3),* pp. 93–95.

News Release, Company: Alliant Computer Systems, Dateline: San Diego, CA, "TGS' Figaro To Be Marketed With Silicon Graphics", Jul. 8, 1988.

News Release, Company: Alliant Computer Systems, Dateline: Atlanta, GA, "Alliant Debuts New Class of System The Visual Supercomputer", Aug. 2, 1988.

News Release, Company: Virtus, Dateline: Pleasanton, CA, "Individual Software Introduces Training for Microsoft Excel 3.0 Windows and Macintosh Versions", Jul. 31, 1991.

News Release, Company: Information Builders, Dateline: Palisades, CA, "Remarkable 3D Main–Frame Graphics Available For PC Users", Feb. 1985.

News Release, Company: Structural Dynamics Res. Intl. Business Machines, Dateline: Boston MA, "Alias Sketch (™) Resumes Shipping: Freeform 3D Illustration and Design Tool", Feb. 19, 1992.

News Release, Company: Information Builders, Inc., Dateline: Palm Desert, CA, "Information Builders Announces Release 3.0 of PC/Focus DBMS", Jun. 1, 1987.

News Release, Company: Alias Research, Dateline: Toronto, Ontario, "Alias Ships Sketch!, Freeform 3D Illustration and Design Program", Nov. 15, 1991.

News Release, Company: Virtus Corporation, Dateline: Cary, NC, "Virtus Walkthrough Releases Quicktime Component", Nov. 1, 1991.

News Release, Company: Honeywell Bull, Dateline: Bilerica, MA "Relational Software System Increases Integration, Productivity for Honeywell Bull Users", Jul. 17, 1987.

"News: What's New—Business Software", *BYTE*, Mar. 1992, p. 78.

"Other Web Sites for Data Mining and Knowledge Discovery," http://kdnuggets.com/websites.html, pp. 1–3, Last updated: Sep. 10, 1997.

Pollack, A., "The 2–D Screen Gives 3–D World" New York Times (date unknown).

*Precision Visuals International Limited*, "Summary of PV–WAVE Point & Click Visual Data Analysis Software", 1991.

Quinlan, J.R., *C4.5: Programs for Machine Learning*, Morgan Kaufmann Publishers, Inc., pp. 17–26 (1993).

Quinlan, J.R., "Induction of Decision Trees," *Machine Learning*, vol. 1, No. 1,pp. 81–106 (1986).

Radding, Alan, "PC GIS: Expect Gain But Also Some Pain", *Computerworld*, Feb. 17, 1992, p. 89.

Rendell, L. and Seshu, R., "Learning hard concepts through constructive induction: framework and rationale," *Computational Intelligence*, vol. 6, No. 4, pp. 247–270 (Nov. 1990).

Sabella, Paolo, "A Rendering Algorithm for VIsualizing 3D Scalar Fields," *Computer Graphics*, vol. 22, No. 4, Aug. 1988, pp. 51–58.

"SAS Data Mining Solution," http://www.sas.com/software/data_mining/whitepapers/solution.html, pp. 1–6, SAS Institute Inc., Copyright 1997, Last Updated Sep. 26, 1997.

Schaffer, C., "A Conservation Law for Generalization Performance," *Machine Learning: Proceedings of the Eleventh International Conference*, Morgan Kaufmann Publishers, Inc., pp. 259–265 (1994).

Shavlik, J.W. and Dietterich, T.G. (Eds.), *Readings in Machine Learning*, Morgan Kaufmann Publishers, Inc., entire book, (1990).

"S*i*ftware: Tools for Data Mining and Knowledge Discovery," http://kdnuggets.com/siftware.html, pp. 1–2, Last updated: Oct. 31, 1997.

"Silicon Graphics MineSet Wins Bronze Miner Award," http://www.sgi.com/Headlines/1997/October/mineset_release.html, pp. 1–2, (Oct. 1, 1997).

Stein et al., "Sorting and Hardware Assisted Rendering for Volume Visualization," *IEEE*, 1995, pp. 83–89.

Structural Dynamics Research Corporation News Release, "SDRC Announces Software Translator BEtween CADAM and I–DEAS", Mar. 31, 1992.

"The 1997 Database Dozen," by D. Stodder, http://www.db-pd.com/96dozen.htm, pp. 1–2, (1996 or 1997).

Thrun et al., "The Monk's Problems: A Performance Comparison of Different Learning Algorithms," *Technical Report CMU–CS–91–197*, Carnegie Mellon University pp. i–x and 1–112, (1991).

Utgoff, P., "Perceptron Trees: A Case Study in Hybrid Concept Representation," *Proceedings of the Seventh National Conference on Artificial Intelligence*, Morgan Kaufmann, vol. 2, pp. 601–606 (Aug. 1988).

Van Wijk et al., "HyperSlice," *Proceedings of Visualization '93*, 1993, pp. 119–125.

Weiss, S.M. and Kulikowski, C.A., *Computer Systems That Learn: Classification and Prediction Methods from Statistics, Neural Nets, Machine Learning, and Expert Systems*, Morgan Kaufmann Publishers, Inc., entire book, (1991).

Westover, Lee, "Footprint Evaluation for Volume Rendering," *Computer Graphics*, vol. 24, No. 4, Aug. 1990, pp. 367–376.

Wilder, C., "Virtual Reality Seeks Practicality", *Computerworld 26 (17)*, Apr. 27, 1992, p. 26.

Wilhelms et al., "A Coherent Projection Approach for Direct Volume Rendering," *Computer Graphics*, vol. 25, No. 4, Jul. 1991, pp. 275–284.

Wong et al., "Dual Multiresolution HyperSlice for Multivariate Data Visualization," *IEEE Symposium on Information Visualization*, Oct. 1996, pp. 74–75.

Yavelow, C., "3–D Sound Found In Space", *New Media*, (Jan. 1993), pp. 40–41.

Amsbury, W., *Data Structures from Arrays to Priority Queues*, Wadsworth Publishing, Belmont, CA, pp. viii and 331–336, Copyright 1985.

Date et al., *A Guide to SQL/DS*, Addison–Wesley Publishing, New York, NY, pp. xiii and 97–118, Copyright 1989.

Hecht–Nielsen, R., *Neurocomputing*, Addison–Wesley Publishing, pp. ix–xiii and 175–201, Copyright 1990.

Hsiao et al., "Supervised Textured Image Segmentation Using Feature Smoothing and Probabilistic Relaxation Techniques", *IEEE Transactions on Pattern Analysis and Machine Intelligence*, vol. 11, No. 12, pp. 1279–1292, Dec. 1989.

Roberts et al., "Continuously Evolving Classification of Signals Corrupted by an Abrupt Change", *IEEE–IMS Workshop on information theory and statistics*, p. 97, Oct. 1994.

Santos–Victor et al., "A Computer Vision System for the Characterization and Classification of Flames in Glass Furnaces", *IEEE Transactions on Industry Applications*, vol. 29, No. 3, pp. 470–478, Jun. 1993.

Taxt et al., "Segmentation of Document Images", *IEEE Transactions on Pattern Analysis and Machine Intelligence*, vol. 11, No. 12, pp. 1322–1329, Dec. 1989.

Venables, W.M. and Ripley, B.D., *Modern Applied Statistics with S–PLUS,* Springer–Verlag, 1994, pp. 413–425.

Mihalisin, T. et al., "A Robust Visual Access and Analysis System for Very Large Multivariate Databases," *Computing Science and Statistics, vol. 26, Computationally Intensive Statistical Models, Proceedings of the 26th Symposium on the Interface,* Jun. 15–18, 1994, pp. 426–430.

Becker, R.A. et al., "Trellis Graphics Displays: A Multi–Dimensional Data Visualization Tool For Data Mining," Presented at KDD' 97, Newport Beach, CA, Aug. 1997, 15 pages.

Kohavi, R., "The Power of Decision Tables," *Machine Learning:ECML–95 (8th European Conference on Machine Learning Heraclion, Crete, Greece),* Apr. 25–27, Springer, 1995, pp. 174–189.

LeBlanc, J. et al., "Exploring N–Dimensional Databases," *Proceedings of the First IEEE Conference on Visualization: Visualization '90,* IEEE Computer Society Press, Oct. 23–26, 1990, pp. 230–237.

Spiegelhalter, D.J. and Knill–Jones, R.P., "Statistical and Knowledge–based Approaches to Clinical Decision–support Systems, with an Application in Gastroenterology," *Journal of the Royal Statistical Society,* vol. 147, Part 1, Royal Statistical Society, 1984, pp. 35–77.

Wnek, J. and Michalski, R.S., "Hypothesis–Driven Constructive Induction in AQ17–HCI: A Method and Experimants," *Machine Learning,* vol. 14, No. 1, Kluwer Academic, Jan. 1994, pp. 139–168.

\* cited by examiner

FIG. 3
(CONVENTIONAL ART)

| | DESCRIPTIVE ATTRIBUTES | | | LABEL |
|---|---|---|---|---|
| sepal_length | sepal_width | petal_length | petal_width | iris_type |
| RECORD 1 → 5.1 | 3.5 | 1.4 | 0.2 | IRIS-SETOSA |
| RECORD 2 → 5.9 | 3 | 5.1 | 1.8 | IRIS-VIRGINICA |
| RECORD 3 → 6.5 | 2.8 | 4.6 | 1.5 | IRIS-VERSICOLOR |
| 6.3 | 2.9 | 5.6 | 1.8 | IRIS-VIRGINICA |
| 6.5 | 3 | 5.8 | 2.2 | IRIS-VIRGINICA |

METHOD, SYSTEM, AND COMPUTER PROGRAM PRODUCT FOR VISUALIZING A DATA STRUCTURE

CROSS-REFERENCE TO RELATED APPLICATION

This patent application claims priority to the commonly owned United States utility application, "Method, System, and Computer Program Product for Visualizing an Evidence Classifier," by B. Becker et al. (application Ser. No. 08/841, 341, now U.S. Pat. No. 5,930,803), filed Apr. 30, 1997, incorporated herein by reference in its entirety.

This patent application is related to the following comnmonly owned United States utility applications:

1. "Method, System, and Computer Program Product for Visualizing a Decision-Tree Classifier," by R. Kohavi et al. (application Ser. No. 08/813,336, filed Mar. 7, 1997, incorporated herein by reference; and 2. "Method, System, and Computer Prograrn Product for Visualizing an Evidence Classifier," by B. Becker et al. (application Ser. No. 08/841,341, filed Apr. 30, 1997, incorporated herein by reference.

BACKGROUND OF THE INVENTION

1. Field of the Invention

The present invention relates generally to machine learning, data mining, and data structure visualization.

2. Related Art

In supervised classification learning, an induction algorithm (or inducer) produces a model from a labeled set of training data. For example, many data mining tasks require classification of data into classes. Typically, a classifier classifies data into classes. The classifier provides a function that maps (classifies) a data item (instance) into one of several predefined classes (labels). The resulting classification model is capable of predicting labels for a new set of unlabeled records that have the same attributes as the training data. The attribute being predicted is called the label, and the attributes used for prediction are called the descriptive attributes. The word attribute is also used here to refer to a column in a relational data set. Thus, given a data set of labeled instances, supervised machine learning algorithms seek a hypothesis (i.e., the model) that will correctly predict the class of future unlabeled instances.

A classifier is generally constructed by an inducer. The inducer is an algorithm that builds the classifier from a training set. The training set consists of records with labels. The training set is used by the inducer to "learn" how to construct the classifier as shown in FIG. 1. Once the classifier is built, it can be used to classify unlabeled records as shown in FIG. 2.

Inducers require a training set, which is a data sat containing attributes, one of which is designed as the class label. The label attribute type must be discrete (e.g., binned values, character string values, or a small set of integers). FIG. 3 shows several records from a sample training set pertaining to an iris data set. The iris data set was originally used in Fisher, R. A., "The use of multiple measurements in taxonomic problems," in *Annals of Eugenics* 7(1):179–188, (1936). It is a classical problem in many statistical texts.

For example, if a classifier for predicting iris_type is built, the classifier can be applied to records containing only the descriptive attributes, and a new column is added with the predicted iris type. See, e.g., the general and easy-to-read introduction to machine learning, Weiss, S. M., and Kulikowski, C. A., *Computer Systems that Learn*, San Mateo, Calif., Morgan Kaufmann Publishers, Inc. (1991), and the edited volume of machine learning techniques, Dietterich, T. G. and Shavlik, J. W. (eds.), *Readings in Machine Learning*, Morgan Kaufmann Publishers, Inc., 1990 (both of which are incorporated herein by reference).

There are several well known types of classifiers, including evidence, neural network, decision tree, and decision table classifiers. An Evidence classifier is also called a Bayes or Bayesian classifier or a Naive-Bayes classifier. The Evidence classifier uses Bayes rule, or equivalents thereof, to compute the probability a given instance belongs to a class. Under the Bayes rule, attributes are assumed to be conditionally independent by the Evidence classifier in determining a label. This conditional independence can be assumed to be a complete conditional independence as in a Naive-Bayes. Alternatively, the complete conditional independence assumption can be relaxed to optimize classifier accuracy or further other design criteria.

For an introduction to decision tree induction, see Quinlan, J. R., C4.5: *Programs for Machine Learning*, Los Altos, Calif., Morgan Kaufmann Publishers, Inc. (1993); and the book on decision trees from a statistical perspective by Breiman et al., *Classification and Regression Trees*, Wadsworth International Group (1984).

Decision Table classifiers are also known. The method of classification is similar to that of a decision tree. Classification is performed by choosing the majority class of the region in which an example is found. Decision Tables are useful in that they present an inherent hierarchy of levels. See Kohavi, R., "The Power of Decision Tables", *Proceedings of the $8^{th}$ European Conference on Machine Learning*, Lavrac et al. (Eds.), Springer Verlag, Berlin, Heidelberg, N.Y., pages 174–189 (1995) (incorporated by reference herein).

In practice, many such classifier models are applied as a black box. It is not necessary to understand the model in order to use it effectively for prediction. Recently, there has been a realization that great insight can be gained by visualizing the structure of a data mining model. Decision trees were one of the earliest classification models to be represented graphically because of their easy to understand structure. See Quinlan, J., C4.5: *Programs For Machine Learning*, Morgan Kaufmann Publishers, Inc. (1993). Neural networks have an arcane structure which is difficult to visualize.

The ability to describe the structure of a classifier in a way that people can easily understand, transforms classifiers from incomprehensible black boxes to tools for knowledge discovery. Classification without an explanation reduces the trust a user has in the system. Some researchers have found that physicians would reject a system that gave insufficient explanation even if the model had good accuracy. See Spiegelhalter and Knill-Jones, *J. Royal Siatltistical Soc.* A 147:35–37 (1984). A human may decide not to use a classifier if he or she realizes that it is based on irrelevant attributes, bad data, or if important factors are being ignored. Current classifier visualizers are directed to other types of classifiers, such as, decision-tree classifiers and evidence classifiers. See co-pending and commonly assigned U.S. application Ser. Nos. 08/813,336 and 08/841,341 (referenced above).

Data mining applications and end-users now need to know how a decision table classifier maps each record to a label. Understanding how a decision table classifier works can lead to an even greater understanding of data. There have been some initial attempts to display Decision Tables in the form of a General Logic Diagram (GIRD). See J. Winek et al., *Machine Learning* 4(2):139–168 (1994). In this format each cell in the Decision Table has a single color to indicate the predicted class.

Several methods of visualizing multi-dimensional data sets that use several variables to form a hierarchy have been proposed. Some have proposed dimensional stacking which shows a single colored cell at the lowest level of the hierarchy. See LeBlanc, J., et al., "Exploring N-Dimensional Databases", *Proceedings of First IEEE Conference on Visualization* (Visualization '90), pages 230–237 (1990) (incorporated by reference herein). Trellis displays have expanded this concept by generalizing the representation of the cell at the lowest level to be a plot of any type, such as a scatterplot, surface plot, or line graph. See Becker, W. et al., "Trellis Graphics Displays: A Multi-Dimensional Data Visualization Tool For Data Mining," presented at KDD '97 Conference, Newport Beach, Calif. (August 1997) (incorporated by reference herein).

A deficiency common to these related methods of displaying multi-dimensional data is that only a single static scene is used to convey information. This limits the amount of information which can be shown in a conventional visualization. Visualizations of complex decision table classifiers with many attributes and many cells cannot be effectively done in a single static scene. For example, a single static scene is limited to two or three levels of detail before the display gets too large or the cells become too small to be useful.

Thus, the attempts to visualize decision table classifiers have resulted in confusing displays where the user has difficulty in seeing the information he or she desires. In addition, conventional attempts to visualize decision table classifiers do not provide navigation capability or drill down features. Finally, the attempts to visualize decision table classifiers do not provide user interaction with the visualized classifiers.

What is needed is a decision table classifier visualizer having interactive capabilities and more comprehensible and informative displays.

SUMMARY OF THE INVENTION

The present invention provides a computer-implemented method, system, and computer program product for visualizing a multi-dimensional data set. A visualization tool is provided that displays information representative of the resulting data structure.

According to a first embodiment of the present invention, a method of visualizing a multi-dimensional data set is provided. A data file is created from the data set, where the data file includes a plurality of records, each record having at least one value associated with at least one attribute. The data file is arranged in a tabular form having a plurality of rows and columns, wherein each of the rows represents an aggregate of all of the records for each combination of the values of the attributes. A label corresponds to one of the attributes of the data file and has one or more associated label values called classes.

According to this first embodiment, a multi-dimensional data structure is created from the data file. The data structure comprises one or more levels arranged in a hierarchal manner, where a first level corresponds to a first datatable representing the data file. Each successive level of the data structure comprises a more aggregated data table corresponding to one or more fewer attributes than a previous level. A top level of the data structure comprises a single row representing all of the aggregated data from the data file.

According to this embodiment, a visualization of the data structure is created, where the visualization includes a first view showing a display of probability information for at least one level of the data structure. The visualization also includes a second view showing prior probabilities of each label value.

In a preferred embodiment, the structure of the data file is stored as a relational table in the memory of a computer system. Next, a hierarchy of tables, such as a decision table classifier, is induced from the data file. The decision table classifier comprises one or more levels arranged in a hierarchal manner. In the decision table classifier, a base level corresponds to the data file. Each successive level of the decision table classifier corresponds to a table of data having two fewer attributes than a previous level. A top level of the decision table comprises a single row representing all of the data from the da.a file. Each level of the decision table classifier includes a probability column and a count column.

Next, a visualization of the induced decision table is created. The visualization includes a decision table pane and a label probability pane. According to one embodiment, the method further inc.udes constructing a scene graph representing the decision table classifier. A visualization of the scene graph is displayed on a computer graphics display. In a preferred embodiment the scene graph is constructed adaptively.

Further features and advantages of the invention, as well as the structure and operation of various embodiments of the invention, are described in detailed below with reference to the accompanying drawings.

BRIEF DESCRIPTION OF THE FIGURES

The file of this patent application contains at leist one drawing executed in color. Copies of this patent with color drawing(s) will be provided by the Patent and Trademark Office upon request and payment of the necessary fee.

The accompanying drawings, which are incorporated herein asnd form part of the specification, illustrate the present invention and, together with the description, further serve to explain the principles of the invention and to enable a person skilled in the pertinent art to make and use the invention.

FIG. 3 shows example records in a training set.

Figure 1:
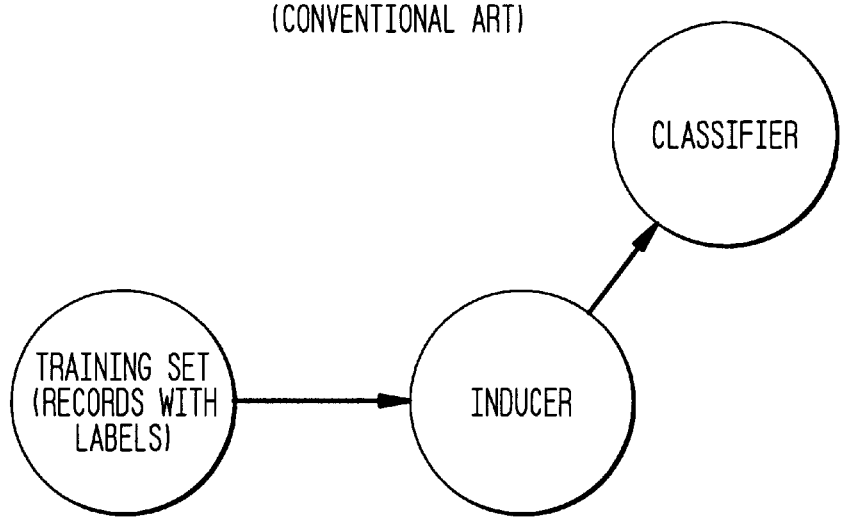
FIG. 1 is a schematic diagram of a conventional training set, inducer, and classifier.
Figure 2:
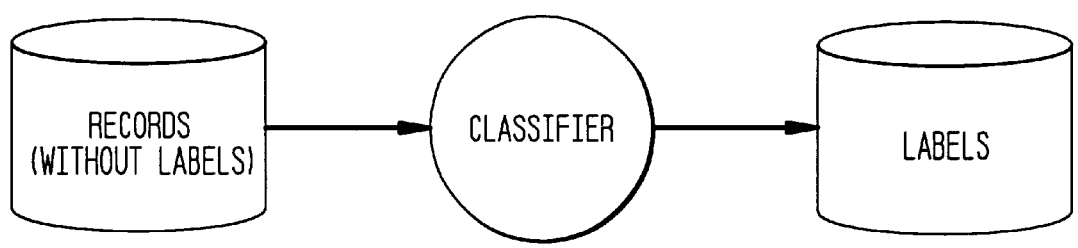
FIG. 2 is a schematic diagram showing the operation of the classifier shown in FIG. 1.

The present invention is described with reference to the accompanying drawings. In the drawings, like reference numbers primarily indicate identical, structurally similar, and/or functionally similar elements. Additionally, the leftmost digit(s) of a reference number identifies the drawing in which the reference number first appears.

DETAILED DESCRIPTION OF THE PREFERRED EMBODIMENTS

1. Overview of the Invention

The present invention is directed to a general purpose, multi-dimensional visualization tool for visualizing a data structure. The data structure comprises one or more levels that can be arranged in a hierarchal manner. A preferred implementation of the present invention is that of a decision table classifier visualization tool, also called a decision table visualizer, for visualizing the structure of a decision table classifier. The decision table visualizer helps a user understand the importance of specific attribute values for classification. Also, the decision table visualizer can be used to gain insight into how the classification is done, and to answer "what if" questions.

For example, the data structure visualizer of the present invention may be used to answer questions such as: when a user knows the values for only a few attributes, what can the user predict for a new record? If the attributes, for which the user knows the values, appear in the top levels of the hierarchy, then this question is answered precisely, instead of approximately, as with an Evidence Classifier Visualizer, such as that described in U.S. patent application Ser. No. 08/841,341, referenced above. In addition, the present invention can be used to determine how the records are distributed with respect to the label for the combination of attribute values that a user is interested in.

According to the present invention, there are several ways to utilize the visualization tool. One way is to visualize a classifier that has been induced.

Machine learning can build accurate models to describe data. The knowledge contained in these models is hidden, however, without an effective way to convey it to users. According to the present invention, the system and method of visualizing data structures takes full advantage of interactive techniques to maximize user control of the model exploration process. With an understanding of the underlying model comes a trust of the results it yields. The combination of machine learning and data visualization gives a far more powerful tool for understanding than either does independently. Thus, the visualization system and method of the present invention provides a model based on many attributes to be understood even by those unfamiliar with machine learing. Various forms of interaction are used to make this visualization more useful than other static designs. Interactive picking, selection, drill-down, drill-up, drill-through, and filtering allow the user to explore in great detail specific regions of interest, while comparing them to other regions that may be higher in the hierarchy.

For example, in one embodiment, a decision table classifier visualizer provides display views that visually show the likelihood that a set of attributes for a particular item has a certain label given one or more known selected attribute values. The decision table visualizer provides display views that show values of one or more attributes which are most useful for classifying a label. The distribution of records by attribute value can also be shown. The decision table visualizer further provides display views that show characteristics of records that have a certain label and the probability that an attribute takes on a certain value given that it has a specific class label. Furthermore, interactive drill-down and drill-through techniques allow a user to explore the various detailed data that is used to generate the probability values.

According to one preferred embodiment, a decision table inducer generates a decision table classifier based on a training set of labeled records. A decision table visualization tool uses the visualization data files to display a decision table level pane and/or a label probability pane.

Alternatively, the visualization tool of the present invention can be used to visualize other types of data structures. For example, the data structure visualization tool can be used to visualize an on-line analytical processor (OLAP) structure. Each of these embodiments will be discussed below.

2. Terminology

Data structures are constructed from multi-dimensional data sets. Data structures comprise one or more separate tables of data that can be arranged in some logical manner. For example, a classifier, such as a decision table classifier, is one example of a data structure that can be utilized in the data structure visualizer of the present invention. Another example data structure is a summarized hypercube structure, such as an OLAP structure.

Decision tables, like decision trees or neutral nets, are classification models used for prediction. Decision tables are induced by machine learning algorithms. A decision table comprises a hierarchical table in which each entry in a higher level table gets broken down by the values of a single additional attribute or pair of additional attributes to form another table. The structure of a decision table is similar to dimensional stacking.

A "classifier" predicts one or more attributes of a set of data, given several other attributes. The attribute being predicted is called the "label." The attributes used for prediction are referred to herein as the "descriptive attributes."

A "training set" comprises records in the data for which a label has been supplied. An algorithm that automatically builds a classifier from a training set is called an "inducer."

An "OLAP" structure refers to a data structure built from an on-line analytical processor. Using on-line analytical processing (OLAP), a relational data set can be converted into a summarized hypercube data structure in order to perform fast queries.

"Record" refers to any type of data record or file having at least one attribute. Records can be provided by any data source, such as, a database, flat file, or direct user input. Additionally, the terms "row" and "record" are also used interchangeably. Each "row" or "record" in an induced decision table corresponds to a particular "bin." "Binning" refers to any conventional process of dividing a real-valued attribute into ranges. Binning can be uniform or non-uniform. In the present invention, these "bins" are eventually visualized.

"Conditional probability" of each label value for a respective attribute value is the conditional probability that a random record chosen only from records with a given label value takes on the attribute value.

"Prior probability" of a label value is the proportion of records having the label value in the original data (training set) divided by the total number of records.

"Posterior probability" is the expected distribution of label values given the combination of selected attribute value(s).

"Data," "data points," "scattered data," "multivariate data," and equivalents therefore, are used interchangeably to refer to a data set having corresponding data attributes that are suitable for a decision table classifier visualization. One data point can contain multiple data attributes. Numerical attributes can include any type of numerical value or range (e.g., real numbers or integers). Categorical attributes have nominal values like text strings. For example, a data attribute representing color can include the following categorical attribute values: "red," "blue," and "orange." Numerical values can also be assigned to each categorical attribute value for sorting and other operations (i.e., "red" can be set to 1, "blue" can be set to 2, and "orange" can be set to 3).

Throughout this description, the terms "columns," "variables," and "attributes" are used interchangeably to refer to the characteristics of a given data point or set of data. In particular, within data mining terminology, data samples are characterized by one or more "attributes." In one embodiment of the present invention, data "attributes" are placed in separate "columns" of a data table.

According to the invention, a graphical representation of one or more levels of the decision table is displayed. Each level can represent one or two additional attributes as compared to a higher (i.e., more aggregated) level. In one embodiment, the structure of each level of the decision table with a pair of attributes is visualized with display views of a decision table pane and/or a label probability pane.

"Decision table pane" as used herein refers to a display of probability information for one or more attributes in a level of a decision table classifier. In one preferred example, the decision table pane includes a hierarchical set of "cake" charts. A cake chart shows a probability distribution or a normalized conditional probability of each label value, or each attribute value at a respective level. Each block or "cake" slice has a size or width which is proportional to the number of records of a given label value having attribute values corresponding to the particularcake chart. In a preferred embodiment, a slice width is a function of the normalized conditional probability of each label value for the respective attribute values.

"Label probability pane" as used herein refers to a display of the prior probability of a respective label values as calculated with respect to the training set used to induce the decision table classifier.

"Drilling-down" techniques allow a user to select a graphical representation of a particular set of attributes at one level of a decision table classifier visualization and view a more detailed level of the decision table for those particular attributes and one or two additional attributes. In other words, "drilling-down" techniques allow a user to view selected attributes with finer granularity. For example, one can drill down to investigate the contribution of other attributes to the conditional probability of the selected attributes. "Drilling-through" or "drill-through" techniques allow a user to view or even manipulate original data from a data source that represnts the current visual selections. By "drilling-through" a user can actually view the data used to induce the decision table.

3. Example Environment

The present invention is implemented in a computer graphics system. The decision table classifier visualization tool of the present invention can be implemented in software, firmware, hardware, and any combination thereof, on a computer system. The decision table classifier visualization tool can be provided on any type of computer system, such as a computer graphics workstation, processor, multi-processor system, computer network, personal stand-alone computer, or any other computer graphics processing environment or application, including, but not limited to, the example data mining network system described below with reference to FIG. 16; the example computer system described below with reference to FIG. 20; and the Mine-Set™ data mining product, manufactured by Silicon Graphics, Inc. as described in MineSet™ User's Guide (version 2.6), Silicon Graphics, Inc., Mountain View, Calif., 1998 (incorporated herein by reference.

The present invention is described in terms of an example computer graphics display tool environment Description in these terms is provided for convenience only. It is not intended that the invention be limited to application in this example environment. In fact, after reading the following description, it will become apparent to a person skilled in the relevant art how to implement alternative environments of the invention.

4. Data Structure Visualization Tool Embodiment a. Overview

The present invention provides a method and system for visualizing large quantities of data in an informative manner. From this visualization, a user can study or make predictions based on labeled classes of data.

In particular, the present invention uses a data structure, such as a decision table hierarchy as the foundation on which to present both generalized and detailed information to a user. A decision table comprises one or more tables of data (also called levels of the decision table) that are arranged in a hierarchical structure. The initial data can be user generated or can be obtained through access to a conventional data set. Each data table within the hierarchical structure is referred to as a level. According to the present invention, the decision table can be visualized in order to present correlations between pairs of attributes to a viewer. The decision table can be used as a visualizer alone, or it can be used as a classifier and visualizer. The underlying structure used for classification is a decision tree which splits on a single attribute at each level of the tree hierarchy. Such a structure is called an oblivious decision tree because any given attribute is binned only one way (unlike general decision trees where an attribute can be split different ways at each node). That attribute is rendered discrete in an identical manner across the whole level. Accuracy is inhibited to a small degree by representing the decision tree in this way, but the advantage is a uniform structure in a compact tabular form, which can easily show correlations between pairs of attributes at adjacent levels in the tree.

The method of classification used by decision tables can be similar to that of a decision tree. For example, in a preferred embodiment, classification is done by picking the majority class of the region in which the example is found. If a record to be classified falls in a region where no training data occurred, classification is done by picking the predominant class one level up in the table hierarchy.

Every combination of attribute values represents a cell of a decision table. However, decision tables can have a very large number of cells at the lowest level. For example, 6 attributes with 8 values per attribute, have potentially $6^8=1,679,616$ cells. Because the data is seldom uniformly distributed over the space, in practice the cell count can be considerably reduced. Even so, the size is usually far too great to deal with interactively in real time if every cell is to be rendered. Even building such a scene can take a prohibitively long time.

According to the present invention, the solution is to provide levels of detail to a user which he or she can incrementally drill-down on. The graphics are not computed for lower levels until a drill-down request occurs. In general, the decision table classifier visualizer attempts to provide a top-level or overview-level to a user, who can then proceed onto more detailed levels of information on demand.

Since the data structure is inherently hierarchical it is straightforward to start with an overview by graphically showing just the top levels of the hierarchy. Three dimensional manipulation through various interactive techniques allows flexible navigation for studying regions of interest. For example, drilling-down locally allows the user to obtain further details on demand. Drill-through techniques can return the actual raw data from which the classifier was induced. Drilling-up refers to reducing the level of detail displayed in the visualization. Filtering on specific values or ranges of values can also be implemented.

An important feature of the present invention is that each of the cells can show a distribution of the probabilities of a class for the records matching that cell. This distribution is shown visually as a graphical representation, such as a pie chart or a rectangular chart, referred to herein as a "cake chart" or "cake." In a preferred embodiment, this distribution (which can be either straight probability or conditional probability) is shown using a cake chart, which is similar to a pie chart, but rectangular in shape and has rectangular slices instead of wedge shaped slices. Other graphical representations of the distribution of the probabilities of a class will be apparent to those of skill in the art based on the present description.

b. Visualization Method

As mentioned above, a classifier predicts one attribute of a set of data, given several other attributes. For example, using a well known machine learning database, if a user has data on mushrooms, a classifier can be generated to predict whether a specific type of mushroom is edible. This prediction is based on other attributes, such as the spore print color of the mushroom, the habitat of the mushroom, the population of the mushroom, the mushroom's odor, etc. Other types of classifiers, based on other classes of information, can be generated according to the present invention.

Figure 4:
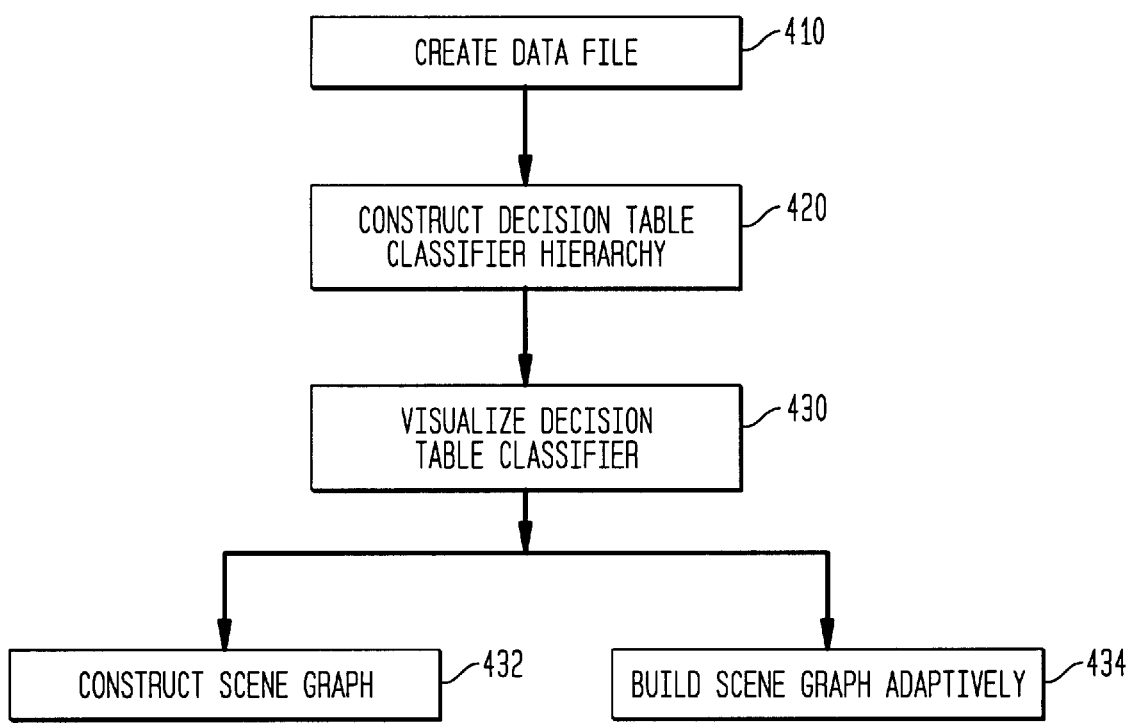
FIG. 4 shows a flowchart of the method of the present invention.

A method for implementing the visualization tool of the present invention is shown in FIG. 4. Method 400 comprises the following steps. In step 410, a data file is created. In step 420, a data structure is constructed. In a preferred embodiment, the data structure is a decision table classifier. In step 430, the data scene graph can be constructed in full (step 432). Optionally, in step 434, a scene graph can be constructed or built adaptively as a user navigates through the data structure. Each of these steps will be described in detail below.

(i) Creating Data Files for the Visualizer

In FIG. 4, step 410, a data or configuration file is created. For purposes of this example description, the data file is created for use in MineSet™. It will be apparent to those of skill in the art given the present description how to create data files in other operating environments.

To create a data file (or a training set of data), a user starts with a data set. For example, a user can select a data set that concerns mushroom data (discussed in more detail below). The data set can often times contain an extremely large amount of raw data. To create a data file that is used by the visualization tool of the present invention, some initial processing of the data set is performed. This processing is used in helping to choose which attribute columns to have in a decision table hierarchy (discussed below). An example base data table is shown below in the next section in Table 1. This base table can be constructed in a number of ways, including using an inducer or using some other user-specified algorithm. In a preferred embodiment of the present invention, an inducer is used to construct the data file.

An example of creating a data file for use in a decision table classifier in a MineSet™ environment is shown herewith. For example, a *.dtableviz file contains a schema and optional history section, and a *.data file contains the data. The decision table visualizer's *.dtableviz file should contain a schema of the following form: some number of columns of type string or enum (e.g., character or number); followed by a float column containing the weight of records; followed by a vector column, indexed by an enumerated type containing possible classes and containing the proportion of the weight of records in each class. A column of type string can include any type of character data. A column of type "enum" contains a binned attribute. The *.diableviz and *.data files can be automatically generated by a Tool Manager, such as the Tool Manager present in MineSet. The MineSet™ data mining product, version 2.6, is manufactured by Silicon Graphics, Inc. Normally, it should not be necessary to modify these files.

The label may be a binned numeric column or it may be string column. Either way it appears as an enum in the schema, so that the final probability (or probs[]) column (see e.g., Tables 1–3 below) can be indexed by it.

An example configuration file created from an "adult" census dataset in MineSet is shown follows:

```
input {
    file "adult.dtableviz.data";
        enum string 'hours_per_week_bin_k'{"-20", "20-28",
"28-36", "36-44", "44-52", "52-60", "60+"};
        enum 'hours_per_week_bin_k''hours_per_week_bin';
        auto enum string 'gross_income_k'{"-9598", "9598-14579",
"14579-24794.5", "24794.5-24806", "24806-29606", "29606-42049.5",
"42049.5-46306.5", "46306.5-64885", "64885+");
        enum 'gross_income_k''gross-income';
        auto enum string 'final_weight_k'{"-223033", "223033+"};
        enum 'final_weight_k''final_weight';
        float 'weight';
        nominal enum string 'label'{"Female", "Male"}; # the label values
        float 'probs[]'[enum 'label']; # and probabilities
}
history {
 :
 :
 :
}
```

In this example, the name of the data file is adult.dtableviz.data. The first three columns in the resulting table are attributes from the data. The first one, hours_per_week_bin, has been binned by the user using the Tool Manager. The second two, gross-income, and final_weight were binned automatically by the mining. Note the use of the auto keyword in their enum definition. The fourth column gives the weight of records having the values given by the first three columns.

The last column, "probs[]," is a vector valued column which gives the probability of each class, computed by dividing the rumber of records for each class by the value in the weight column The sum of the entries of this vector must add to 1. Note that the definition of the index label includes the keyword nominal to show that the class values are not numeric, and hence do not have an implied ordering. The nominal keyword would not be present had the label been a binned numeric attribute.

The above data file creation is offered as an example only. It will be apparent to those of skill in the art given the present description how to create a data file in other operating environments according to step 410 of FIG. 4.

(ii) Creating a Data Structure

Categorical data is available from a number of data base sources, including data gathering groups, associations, and societies. This categorical data can be used to create a training set of data. These training sets comprise records in the data for which a label has been supplied. As discussed above, in step 410, a data file, or training set of data is created. This training set provides the foundation or base level of records from which a data structure, such as a decision table classifier, can be created.

In step 420 a data structure is constructed. The type of data structure is not limited, although multi-dimensional data structure are preferred. For example, the data structure can be a decision table classifier. Alternatively, the data structure can be an on-line analytical processor (referred to as "OLAP") structure. Other types of data structures can be constructed as would be apparent to those of skill in the art based on the present description.

In a preferred embodiment, a decision table classifier is constructed in step 420. Given a training set of labeled records, an induction algorithm can be used to create a classifier. The induction algorithm decides which features to include in the set of attributes that are included in the table (also referred to as a schema). In addition, the induction algorithm decides which instances to store in the set of labeled instances (also referred to as the body of the decision table) that is defined by the attributes in the schema.

In a preferred embodiment, given a training set of data, an induction algorithm creates a decision table classifier. Part of the training set can be held out or separated from the rest of the training data. This part is referred to as the test set. The test set is a data set that can be used for testing at a later time. The remainder portion of the data is referred to as the training set. This training set is then used to induce the decision table classifier. The test set can then be used to determine the accuracy of the classifier.

Step 420 can be performed by automatic selection of attributes. For example, the MineSet™ data mining product, version 2.6, manufactured by Silicon Graphics, Inc., can be used to build a classifier automatically. In this implementation, the inducer will automatically pick attributes to put at each level of the decision table so that accuracy is maximized.

Alternatively, a user may apply their own knowledge of the domain to specify some or all of the attributes to use at each level of the hierarchy. Thus, no real data mining capability is necessary, as each level of the decision table is user specified. For example, a user can pick a label to assign a color. Then the user can specify exactly which attributes that are desired at each level. The inducer can then construct the decision table hierarchy according to the user's chosen attributes. Using the tool this way may not build a model with maximal accuracy, but it may be more useful for gaining understanding of one's data. Attributes with the greatest discriminating power for a label can be placed in the upper levels of the decision table hierarchy.

For example, with respect to the mushroom data set discussed above, suppose a very simple decision table (with only one level) is to be used. After a base data table is created according to step 410, a user may pick two attributes, such as "odor" and "spore print color." The records pertaining to these attributes are then aggregated to produce a table with every combination of odor and spore print color values. This aggregation of values will generate a higher level of a decision table hierarchy. So in the new data file that is created, instead of having a high number of rows (e.g. 5000 rows), the resulting data file would have only a few rows (e.g., 6 rows) that correspond to every combination of odor and spore print color. Each of these columns would then have a column for weight and the probabilities. In this example, weight is the number of records that each of the combination of values. Probability and weight columns are discussed in detail below.

An example decision table hierarchy is shown below in Tables 1–3. The attributes and corresponding data listed are for illustrative purposes only.

TABLE 1

| | | Level 2 | | | |
|---|---|---|---|---|---|
| Attrib1 | Attrib2 | Attrib3 | Attrib4 | Weight | Probability [] |
| a | 10–20 | 4–9 | yes | 10 | .3, .6, .1 |
| a | 10–20 | 9–10 | yes | 34 | .61, .37, .02 |
| a | 20–30 | 9–10 | yes | 123 | .1, .6, .3 |
| a | 20–30 | 9–10 | no | 1 | 1., 0., 0. |
| a | 20–30 | 10–18 | yes | 5 | .8, .2, 0 |
| a | 20–30 | 10–18 | no | 23 | .2, .3, .5 |
| : | : | : | : | : | : |
| d | 40–50 | 4–9 | yes | 2 | .5, .5, 0. |

TABLE 1-continued

Level 2

| Attrib1 | Attrib2 | Attrib3 | Attrib4 | Weight | Probability [] |
|---------|---------|---------|---------|--------|----------------|
| d | 40–50 | 9–10 | no | 7 | 0., 1., 0. |
| d | 40–50 | 10–18 | no | 9 | .33, .33, .33 |

TABLE 2

Level 1

| Attrib1 | Attrib2 | Weight | Probability[] |
|---------|---------|--------|---------------|
| a | 10–20 | 44 | .61, .34, .05 |
| a | 20–30 | 850 | .23, .41, .36 |
| a | 30–40 | 230 | .35, .2, .45 |
| a | 40–50 | 56 | .12, .28, .60 |
| ⋮ | ⋮ | ⋮ | ⋮ |
| d | 40–50 | 120 | .17, .31, .52 |

TABLE 3

Level 0

| Weight | Probability [] |
|--------|----------------|
| 19,345 | .32, .33, .35 |

In this example, these tables correspond to different "levels" of the decision table hierarchy. The decision table is induced given a data set with four attributes plus a label which has 3 values (or classes). These attributes can correspond to any given property of the data (in this example, they are just any random attribute). Table 1 shows the base level, which corresponds to the lowest (least aggregated) data level (or highest degree of detail). Base Table 1 can be generated according to step 410. There is a row for every combination of attribute values that have representative records. As a result, no row can have 0 (zero) weight. In Table 1, all four attribute columns are represented. Table 2 shows a higher level of the decision table with less data granularity. For example, in Table 2, all of the records for attribute 1 ("a") and attribute 2 ("20–30") are binned together, regardless of the values of attributes 3 and 4. See e.g., FIG. 13, described below. Table 3, which has only one row, shows the highest (or most aggregated) level, which is at the very top of the decision table hierarchy. In this example, Table 3 corresponds to the most aggregated level (level 0) with the least amount of granularity or highest degree of generality. See e.g., FIG. 12, described below.

As discussed in more detail below, according to the present invention, each row of the decision table corresponds to a cake chart in the visualization. For example, the Weight column can correspond to the height of the cake chart used in the visualization. As referred to herein, the "weight" can be determined either as a function of the number of data points in a corresponding bin or by the value of some other attribute. In a preferred embodiment, the "weight" corresponds to the sum of the counts or the number of records (or sum of record weights).

Further, the proportion of those records in each class (i.e,. the Prob. [] or Probability[] column) can correspond to the sizes of the slices of the cake used in the visualization. For example, the Probability[] column may correspond to three different ranges. See e.g., FIGS. 8 and 9A below, where the probability label corresponds to three different income ranges.

If more data points are available for a specific set of attributes, the height of the corresponding cake chart will be higher. This height provides an indication to the user that can lead to a greater confidence in the prediction. In a preferred embodiment, the geometry is represented as a scene graph (described in detail below).

According to the present invention, attributes should have some set of discrete values for the classifier to be effective. If an attribute is continuous, the inducer of the present invention uses entropy based discretization so that the distribution of classes in adjacent bins are as different as possible. This discretization can be done globally. See, e.g., Kohavi, R. and Sahami, M., ""Error-Based and Entropy-Based Discretization of Continuous Features", *Proceedings of the Second International Conference on Knowledge Discovery and Data Mining* (1996), pp. 114–119 (incorporated by reference herein).

The ordering of the bins for the continuous attributes is explicit. In the case of categorical attributes, the values can be ordered in at least three meaningful ways, including: (1) alphabetically; (2) numerically by record weights; or (3) numerically by correlation with one of the classes to be predicted. In a preferred embodiment, ordering by the third method provides the most benefit. If a particular class is selected for sorting by label probability, then the selected class is used in determining the ordering. This type of ordering has been found useful in trellis displays and in visualizing the structure of a Simple Bayesian Classifier. Other modifications or variations of these ordering techniques will be apparent to one of ordinary skill in the art based on the present description.

By looking at how dramatically the distributions change along an axis, it is possible to see how well that categorical attribute correlates with the label, and also how it interacts with the other attribute mapped to that level of the hierarchy. For example, FIGS. 5–7 (discussed below) show the interaction between the odor and spore-print color attributes in a mushroom data set. The values for the more edible mushrooms appear in the lower left because the ordering of nominals has been specified to be by correlation with edibility.

It is also common for relational data to contain NULL (or unknown) values. According to the present invention, these NULL values are treated quite differently from 0 or some other value. If an attribute has NULL values, then the unknown values are denoted by a symbol such as a question mark ("?") in the visualization (described below). The NULL value, if present, always appears as the first value, and does not get sorted with the rest. Viewing of NULLs can be toggled on or off so that they do not interfere with observing trends in the non-null data.

Further, according to the present invention, nominal values which contain less than a certain percentage of the data may be filtered out in order to simplify the visualization. This is useful because in many data sets there are some nominal attributes with many unique values. The visualization does not perform well if one axis has many more values than its pair at a given level. In a preferred embodiment, a user can utilize an algorithm designed to swap attributes at each level to keep the overall x-axis/y-axis ratio as constant as possible. In practice, a user is interested in the values that are most prevalent. Accordingly, a control input means, such as a slider, can be provided to filter values that have less than some small percentage of the total weight.

As mentioned above, according to another embodiment of the present invention, the data structure that is constructed in step 420 can be an OLAP structure. Using on-line analytical processing (OLAP), a relational data set can be converted into a summarized hypercube data structure in order to perform fast queries. While this data structure is not a classifier data structure, such as a decision table classifier, the type of data structure that is built using OLAP can be used for similar tests. OLAP structures include relational OLAP structures and multi-dimensional OLAP structures. See "The Case for Relational OLAP," available from MicroStrategy, Inc. at their INTERNET website: http://www.strategy.com/dw_forum/whitepapers/case4rolap/sec22arch.htm (incorporated by reference herein).

(iii) Visualizing the Data Structure

In a preferred embodiment, as discussed above, a data structure, such as a decision table classifier, is stored as a relational table. Each row represents an aggregate of all the records for each combination of values of the attributes used. Once loaded into memory, a hierarchy of levels (or separate data tables) is constructed in step 420. The base level contains the least aggregated data. Each new datatable one level higher up in the hierarchy is mere aggregated, having two fewer attributes. Besides a column for each attribute, there is a column for the record count (or more generally, sum of record weights), and a column containing a vector of probabilities (each probability gives the proportion of records in each class). Finally, at the top-most level, a single row represents all the aggregated data. See e.g., Table 3, discussed supra.

Using the levels of the data structure that have been produced according to steps 410 and 420, in step 430 of FIG. 4, the data structure is visualized. In a preferred embodiment, a decision table classifier is visualized. Alternatively, other data structures, such as a summarized hypercube data structure (e.g., OLAP structure), can be visualized in step 430.

In one implementation of step 430, a scene graph can be built (step 432). The scene graph can be built using an object oriented graphics programming interface, such as the Open Inventor™ (also called "Inventor") product sold by Silicon Graphics, Inc. In this implementation, a scene graph corresponding to every level of detail of the data structure is built. However, in practice, building a scene graph corresponding to every level of detail of the data structure can take an enormous amount of time even with the fastest of computer processors.

According to an alternative preferred embodiment of the present invention, a scene graph is adaptively built in step 434. Adaptively building a scene graph makes the visualization much more efficient in that the only certain levels of the data structure are rendered at any given time. This feature will be discussed in more detail in a later section.

(iv) Example Visualization of a Decision Table Classifier Model

According to the present invention, once a data structure, such as a decision table classifier, has been built (preferably on a server or other high performance processor or multi-processor system), the structure is passed to the visualization tool for display. As a result, the visualization application never loads the whole data set into memory. However, drill-through techniques may be used to retrieve some subset of the original data. For example, the visualization can be used to show the structure of the decision table classifier induced from a training set or it can show the structure once the test set has been "back-fit" into the classifier to update all of the weights and probabilities (see FIG. 19, described below).

Figure 5:
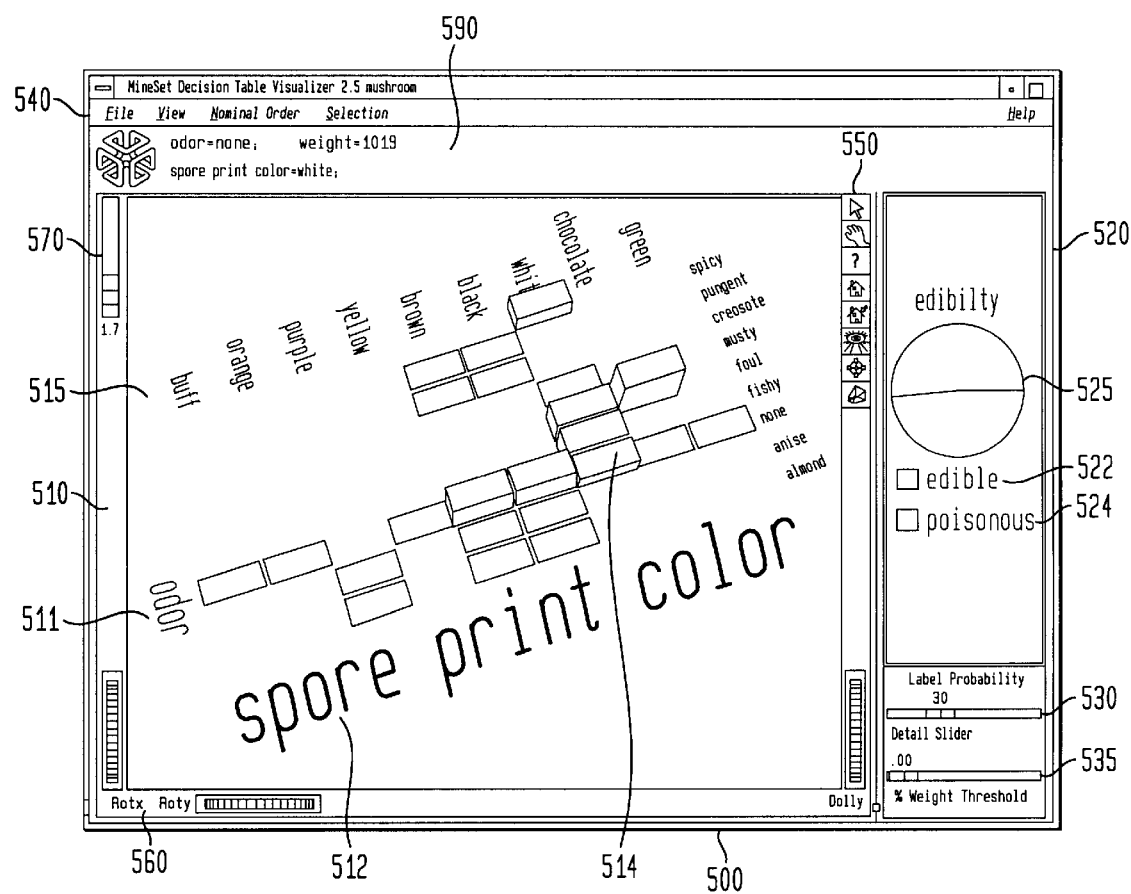
FIG. 5 includes a decision table pane on the left and a label probability pane on the right showing decision table classifier information for an example mushroom database.

An example decision table classifier visualization is shown in FIG. 5 for a mushroom dataset. The decision table is hierarchical in structure like a decision tree, but breaks the data down by two attributes at each level instead of just one attribute. Decision tables do not have to assume that the attributes are independent.

Figure 6:
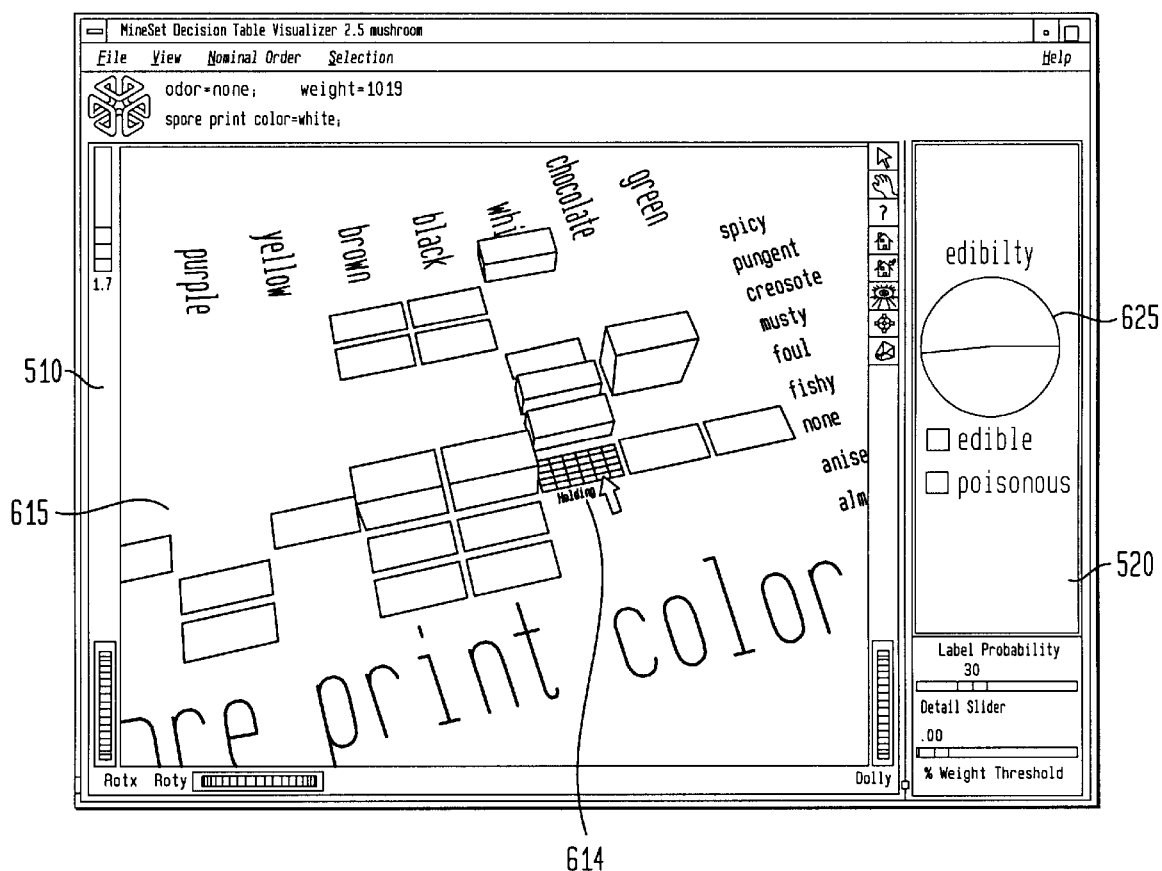
FIGS. 6 and 7 show a decision table pane and a label probability pane for an example mushroom database where a user has performed a drill-down on a cake.
Figure 7:
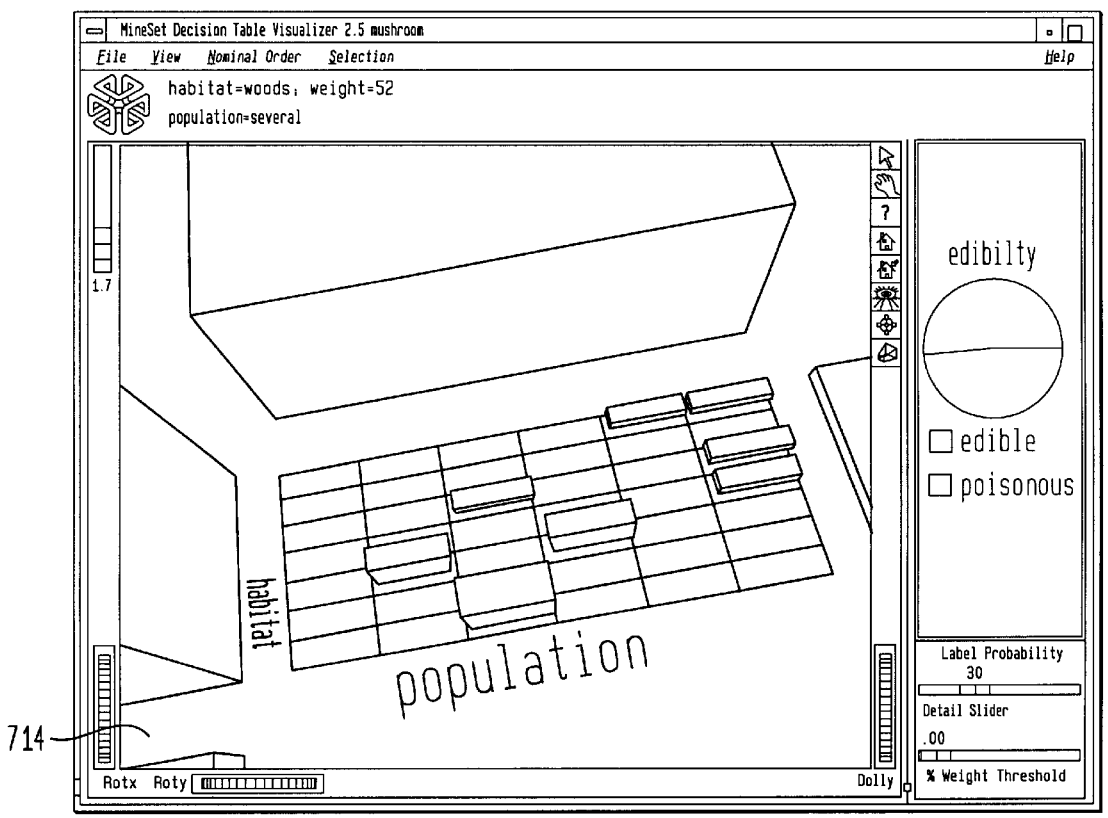

FIGS. 5, 6, and 7 show different displays of decision table classifier information illustrating the operation of an decision table classifier visualization tool according to one embodiment of the present invention.

FIG. 5 visualizes the structure of a decision table classifier operating in a mushroom data set. The decision table classifier is used to determine mushroom edibility. This visualization allows a user to understand what factors effect mushroom edibility and to predict whether a certain mushroom is likely to edible or poisonous, based on a set of attributes for that particular mushroom. For the mushroom database, which is well known in machine learning disciplines, there are over a dozen attributes in the original data. Data used in a mushroom sample file is found in *Audubon Society Field Guide to North American Mushrooms*, Alfred A. Knopf, New York (1981). According to the present invention, however, it is not necessary to use all of them in order to build an accurate classification model. The decision table classifier whose structure is shown in FIGS. 5–7 uses only four of the attributes.

In this example, mushroom edibility corresponds to the "label," which gets mapped to a graphical attribute, such as color. At each less aggregated level of the hierarchy, at least two additional attributes are being displayed. For example, in this figure, the attributes "odor" and "spore print color" correspond to the most important attributes from which to make the determination concerning mushroom edibility. According to the present invention, these two attributes are chosen as the most important either by the inducer (which maximizes accuracy) or by the user (who can actively select whichever attributes are to be chosen). Since there are over 8000 records in this set, running an inducer might take several minutes. In the MineSet™ implementation, the file: /usr/lib/MineSet/dtableviz/examples/mushroom-dtab.dtableviz shows the structure of the decision table classifier induced for this example. This file can be generated by running the inducer on /usr/lib/MineSet/data/mushroom.schema.

FIG. 5 shows a screen display 500 of a decision table classifier visualization tool according to one embodiment of the present invention. Screen display 500 includes a decision table pane 510 and a label probability pane 520. Decision table pane 510 and label probability pane 520 show decision table classifier structure information relating to the classification of an example mushroom database.

Decision table pane 510 shows a level of detail for a decision table induced from the mushroom data set. Decision table pane 510 shows a decision table pane display view 515. First decision table pane display view 515 shows a distribution of each label value, for each combination of attribute values. Each block or "cake" slice has a size which is a function of the number (weight) of records of each label value having the respective attribute values.

Figure 10A:
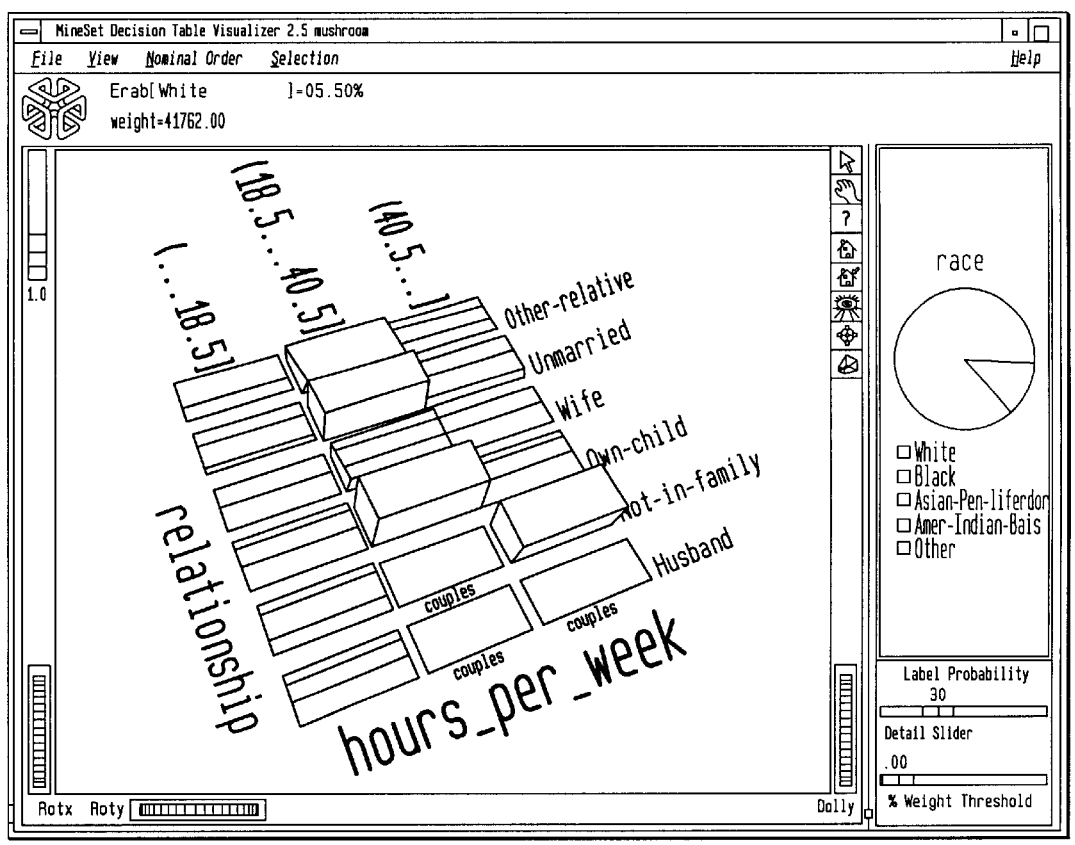
FIG. 10A shows a display of a probability distribution.

The distributions are depicted by the cake charts in decision table pane display view 515. According to the present invention, two modes may be utilized to show the distributions. In one embodiment, a straight probability distribution mode can be utilized. This straight probability mode is based on the number of counts. In another embodiment, a conditional probability (or "evidence") mode can be depicted in decision table pane display view 515. The "evidence" mode is helpful when there is a significant skew in the prior probability distribution. Each of these modes is described in greater detail below with respect to FIGS. 10A and 10B.

As mentioned above, the height of the cake chart corresponds to the number (weight) of records (i.e., the weight column of the corresponding level of the decision table). See e.g., Tables 1–3, discussed supra. The slices of the cake are determined by the proportion of those records in each class. See e.g., the Probability[] column in Tables 1–3, discussed supra. Each cake slice further has a cake slice graphical attribute, such as color, which is representative of a label value (here, mushroom edibility being either edible or poisonous). Color and height are only examples of graphical attributes and are not intended to limit the present invention. In general, any graphical attribute can be used for a cake slice graphical attribute or a cake chart graphical attribute irLcluding, but not limited to, color, opacity, dimension, size, text, shape, and texture.

Moreover, other types of attributes for the mushroom data set may comprise a continuous numeric attribute. In these instances, values are automatically binned. According to a feature of the present invention, continuous numeric attribute values can be binned into ranges, i.e., bins, which maximize differences in distribution with respect to the label between adjacent binned ranges.

For clarity and economy of space, attribute values are not always shown under the cake charts. For example, attribute values for a cake chart of interest can be shown in a legend above decision table pane 510 when, for example, the mouse cursor is moved over a given cake. This interactive feature is referred to herein as "picking." Of course, the present invention is not limited to this option. Attribute values can be displayed near each cake chart, in a separate table or view panel or in any other display format.

Several important layout concerns are also addressed by the present invention. These layout concerns include: aspect ratios, overlapping text, and reducing the amount of geometry to draw.

The aspect ratio is the ratio of the length of the cake chart to the width. An aspect ratio of 1 (one) is optimal, but very large extremes may result if one axis has many more values than the other, or even if one txis has moderately more values for several levels in a row. According to the present invention, a solution is to interchange attributes at levels until the aspect ratio becomes as close to one as possible at every level.

Ideally, a user would like to view text labels that annotate every cake chart in the scene displayed on screen. Unfortunately, if that were done the text would obscure other objects or be too small to read. According to a feature of the present invention, value labels are shown at the edges (right and top) and are shown if there is no data in the region to the left or top of a given cake chart. Occasionally there is still overlap, but in most cases the text is still readable because of the difference in scale and color. The text in the scene has four levels of detail that are controlled automatically based on the user's distance.

Each mushroom in the original data set has many characteristics, including cap-color, bruises, spore print color, stalk size., and odor. In addition, all the attributes in this data set are nominal, thus all of the values can be sorted according to how well they predict edibility. In this example, odor 511 and spore-print-color 512 were chosen to be at the top level because doing so improves the accuracy of the underlying decision table classifier. In this data set a dependence is shown between odor and spore-print-color at the top level. Each of the top level attributes is broken down into 9 specific attributes. For example, odor 511, corresponds to 9 distinct types of odor: spicy, pungent, creosate, musty, foul, fishy, none, anise, and almond. Spore print color 512 corresponds to 9 distinct colors: green, chocolate, white, black, brown, yellow, purple, orange, and buff. Thus, decision table pane display view 515 is represented by a 9×9 matrix of cakes.

Label probability for the decision table is shown in label probability pane 520. For this example mushroom database, two labels are possible: edible 522 or poisonous 524. Label probability pane 520 includes a first label probability pane display view 525 that shows prior probabilities of each label value based on the training set. In FIG. 5, label probability pane display view 525 is a pie chart for an edibility label (edible 522 or poisonous 524.). Each pie slice has a pie slice graphical attribute, such as, color, representative of a label. For example, a red (or dark) slice denotes "edible" and a white slice denotes "poisonous."

Each pie slice in label probability pane 520 has a size proportional to the prior probability of a respective label value as calculated with respect to the training set. The prior probability for each class label is depicted in label probability pane display view 525 in label probability pane 520. The prior probability for a class label is the probability of seeing this label in the data for a randomly chosen record, ignoring all attribute values. Mathematically, this is the number of records with the class label divided by the total number of records. The probability distribution for each rectangular block or c ake in decision table pane display view 515, shows the proportion of records in cach class considering only records having that particular combination of values. These probabilities are precise for the data given.

For example, the prior probability for each class label, as depicted in a pie chart in label probability pane display view 525, is the probability of seeing a label in the data for a randomly chosen record, ignoring other attribute values. Mathematically, the prior probability for a label (in this example, edible or poisonous) is the number of records having the class label divided by the total number of records in a training set (mushroom database set). In the pie chart shown in the label probability pane 520, the "edible" slice is slightly greater in size than the "poisonous" slice, indicating that an unlabeled record has a slightly greater chance of being classified by the decision table classifier as an edible mushroom as opposed to being labeled a poisonous mushroom.

According to a further feature of the present invention, a detail slider 530 is also included in screen display 500. Detail slider 530 can be a slider, as shown, or alternatively, any other type of control input means, including, but not limited to, thumb wheels, dials, buttons, and menus. Detail slider 530 permits a user to control the amount of global drill-down on all cakes shown. For example, when at one extreme, only one cake is shown. At the other extreme, all cakes are shown.

Height scale slider 570 scales the height of cake charts in the decision table pane display view 515. Height scale slider 570 also scales the heights of cakes in a second decision table pane display view described further below with respect to FIGS. 6 and 7. In this way, the height scale slider 570 can be adjusted by a user to magnify small differences.

According to another feature of the present invention, a percent weight threshold slider 535 can be used. The height corresponds to the weight of the training set records that have reached this node (this is the number of records if weighting was not used). In general, the higher the weight, the more reliable the class distribution the cake. Thus, percent weight threshold slider 535 allows a user to control a low count threshold, and thereby filter out attribute values having relatively low record counts. This threshold determines which attribute values are included in the decision table pane display view (see FIG. 6), namely, only those attribute values which have a weight that equals or exceeds the threshold set by slider 535. In this way, less meaningful and less statistically significant attribute values do not have to be included in the decision table pane 510.

In FIG. 5, other external controls surround the decision table pane 510. These external controls comprise an array 550 of eight viewer buttons (Arrow, Hand, Viewer Help, Home, Set Home, View All, Seek, and Persepective) and a set 560 of three thump wheels (Rotx, Roty, and Dolly).

Arrow puts a user in select mode for both decision table pane 510 and label probability pane 520. When in select mode, the cursor becomes an arrow. Clicking on an object selects it (to be discussed infra). Select mode lets a user highlight, or pick, entities in the decision table pane 510 or select labels in the label probability pane 520. By "picking" a cake, relevant information about the cake can be displayed in a legend.

Hand puts a user in a grasp mode for both decision table pane 510 and label probability pane 520. When in grasp mode, the cursor becomes a hand. Grasp mode lets a user rotate, zoom, and pin the dislay in decision table pane 510, or pin and zoom in label probability pane 520.

Viewer Help brings a help window describing the viewer for the decision table visualization tool. Home takes a user to a designated location. Initially, this location is a first view point shown after invoking the decision table visualizer and specifying configuration file. If a user has been working with the decision table visualizer and has clicked the Set Home button, then clicking the Home button returns a user to the view point that was current when the Set Home was last clicked. Set Home makes a user's current location the home location.

View All lets the user view the entire graphic display of the decision table pane display view 515, keeping the angle of view a user had before clicking the View All option. To get an overhead view of the scene, a camera can be rotated so that a user looks directely down on the entities, then the View All can be clicked.

Seek takes the user to the point or object a user selects after the Seek button is clicked. Perspective is a button that lets the user view a scene in decision table pane 510 in three dimensional (3-D) perspective. In other words, closer objects appear larger and further objects appear smaller. Clicking Perspective again turns 3-D perspective off.

The set 560 of the three thumb wheels allows a user to dynamically move a camera view point. Rotx and Roty thumb wheels rotate a scene about an x or y axis, respectively. Dolly thumb wheel moves a camera view point forward or backward, that is, closer or further away from a scene in a decision table pane 510. When Perspective is off, the Dolly thumb wheel becomes a zoom-thumb wheel. Mouse controls (not shown) allow further interaction with a displaying view.

Control bar 540 has several pull-down menus (File, View, Nominal Order, Selection and Help) that access the decision table classifier visualizer tool functions. File menu lets a user open a open a new configuration file, save under a new name, print an image of the current display, start the Tool Manager, reopen the current configuration file, or exit the Decision Table Visualizer.

View menu lets a user control certain aspects of what is shown in decision table pane 510. This menu contains several options: Show Window Decoration, Show Nulls, and Use Landscape Viewer (or Use Examiner Viewer). Use Landscape Viewer or Use Examiner Viewer provide alternative ways to navigate through the scene.

Show Window Decoration lets a user hide or show the external controls around decision table pane 510.

Show Nulls lets a user toggle the display of null values. Null values, if present, are shown as the first value, off-set slightly from other non-Null values. As mentioned above, if an attribute has unknown (NULL) values, then the unknown values are denoted by a symbol In the MineSet™ environment, the preferred symbol is a question mark (?). The NULL always appears as the first value if present and does not get sorted with the rest.

Use Landscape Viewer (or Use Examiner Viewer) switches to an alternative mode of 3-D navigation. In a preferred embodiment, the middle mouse button is used for navigation in the Landscape viewer. In order to drill-up, a user must click the middle mouse button while holding down the Ctrl key.

The Nominal Order menu allows a user to control how values for nominal attributes are ordered. In this embodiment, three choices are provided. First, the Alphabetical option implies that attributes with nominal values are sorted from left to right (or bottom to top) alphabetically. Second, the Weight option sorts values from left to right (bottom to top), with those having the largest weight of records appearing toward the left (bottom). Third, the Label Probability (here, the default) option sorts the values of nominal attributes by the size of the slices corresponding to one of the classes. If the label is a binned attribute, the highest bin is used by default. If the label is nominal, then whatever class has the largest slice in the prior probability pie is used by default. If a particular class is selected, and then sort by label probability is requested, the selected class is used for determining the ordering. In all cases, if there is a NULL value, it remains the first value. In a preferred embodiment, by default, values of nominal attributes are sorted by how well they predict one of the classes. This helps identify important values. If the label is a binned attribute, the class that is the highest bin is used. If the label is nominal, then the class with the largest slice in the prior probability pie is used. Thus, when a user selects a particular class, and requests a sort by label probability with this option, that class determines the order of the result. Alternatively, the values of the nominal attributes can De sorted alphabetically or by weight. Values of binned attributes are always shown in their natural order in label probability pane 520.

The Selection menu allows a user to drill-through to the underlying data. To do a drill-through first, a user selects (e.g., by clicking on) some combination of values and/or a class, then chooses a method of drilling-through to the underlying records. There are three menu items in the Selection menu. First, the Show Original Data option causes the records corresponding to the selected item to be displayed in a record viewer. Second, the Send to Tool Manager option causes a filter operation to be inserted at the beginning of the Tool Manager history. For example, the actual expression used to perform the drill-through can be determined by: the cakes selected in the Main Window, and/or the class (optionally) selected on the right. Selected cakes are <OR>ed together and then <AND>ed with the selected class, if present, to form a drill-through expression to do the filtering in a Tool Manager, such as the Tool Manager provided in MineSet™. If nothing is selected, a warning message appears.

Figures 9A, 9B:
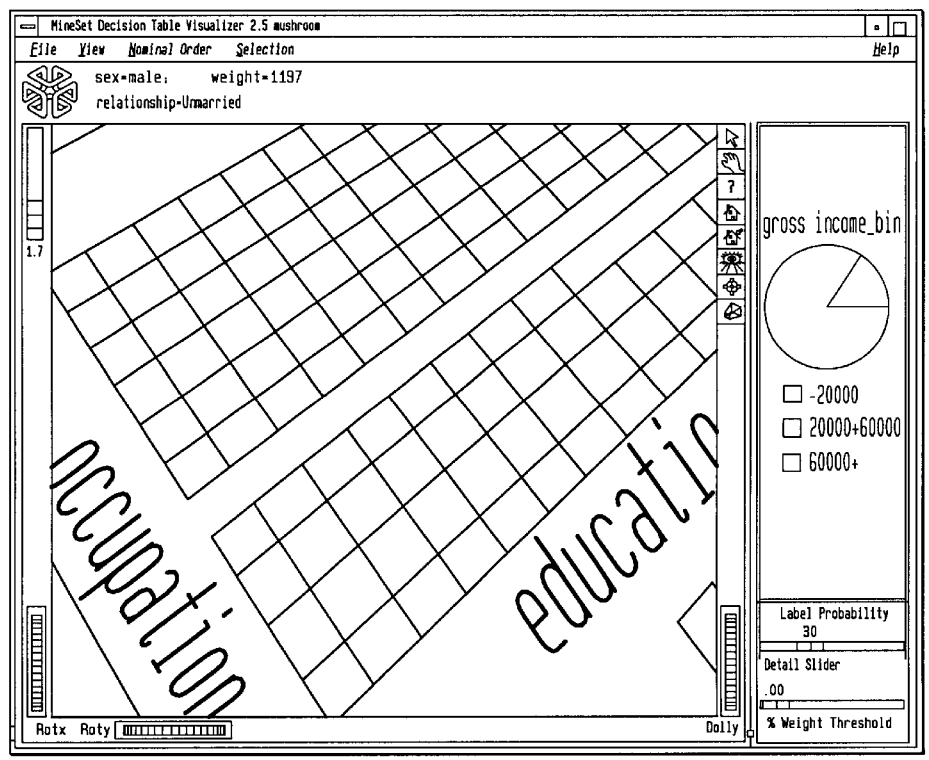
FIG. 9B shows a display of records resulting from a drill-through operation.

For example, if using a census database, such as shown in FIG. 9A (discussed below), the filter expression corresponding to the selections can be:

```
('gross income' > 60000.0) &&
    (('occupation' == "Tech-support")   &&   ('education' ==
"Doctorate"))    ||
    (
        ('occupation' == "Prof-specialty")   &&   ('education' ==
"Doctorate")  &&
            ('sex' == "Female") && ('race' == "Amer-Indian-Eskimo")
    )
```

The three major terms in this expression correspond to the selected class on the right, the selected cake at the top level, and the selected cake at the second level, respectively.

The third Selection option is Complementary Drill Through, which uses the complement of the expression defined by the selected objects for drill-through.

Finally, the Help menu has five command options (Click for Help, Overview, Index, Keys & Shortcuts, Product Information, and MineSet™ User's Guide) which further describe the operation of the visualization tool.

As shown in FIG. 5, a user has selected cake 514. The selected attributes for cake 514, along with the weight of the selected cake, are shown in legend 590. When a cursor is positioned over a cake, a legend 590 is displayed within display 500. Legend 590 displays characteristics of the attribute value(s) over which a cursor arrow pointer is positioned. In this case, legend 590 shows that the cursor is positioned over a cake chart representing an odor attribute value of "none" and a spore print color attribute of "white." Legend 590 further indicates that the cake chart has a height corresponding to a weight of 1019 records.

Additionally, as shown in decision table pane display view 515, a user can readily observe that there is only one cake with any ambiguity, cake 514, meaning more than one class is present. This ambiguity is graphically represented by cake 514 having a dual color, with one slice being dark and a smaller slice being white.

According to the present invention, a user can explore this ambiguity by implementing an interactive feature such as drill-down, in order to examine this particular cake in much greater detail. Interaction is crucial when a large model is to be explored and understood. It is often impractical to display everything in a static scene and have it be comprehensible. According to the present invention, interactive features can be used to render a data structure display, such as a decision table classifier visualization more comprehensible to the viewer. As mentioned above, these interaction techniques include: selection, drill-down, drill-up, drill-through, and filtering.

For example, a drill-down technique allows a user to view more detailed information pertaining to a selected set of attributes. Drilling-down can be implemented in any number of user selected manners. A user can drill-down into a selected cake chart by moving, for example, a mouse cursor over the cake chart of interest and then clicking a right or left mouse button. In a preferred embodiment, when implementing a drill-down into a cake chart, the data represented by that cake is re-displayed in a new matrix of cake charts where the attributes assigned to that level of detail are used as the axes. Note that this specific example of implementing a drill-down feature is for illustrative purposes only and is not intended as a limitation. Other ways of implementing a drill-down may be apparent to those of skill in the art based on the present description.

Filtering also provides valuable interaction. For example, a user can select just attribute values of interest. Then the visualization will display only those values and remove all other values within the attributes from the display. See FIG. 18B, described below. This simplification of the visualization helps lead to better understandability, especially when attempting to view upwards of one hundred or more values.

When a user drills-down to the next level of the decision table (e.g., by clicking the right mouse button over the desired cake chart, here cake 514), more detail of the decision table is visualized. As shown in FIG. 6, for this example, the attributes habitat and population are used to resolve the ambiguity visualized in cake 514. For example, a user can drill-down into a rectangular cake 514 (in FIG. 6, the cake corresponding to odor=none and spore print color= white) by using the right mouse button, or some other graphics user interface tool. As a result, the data represented by that cake is redisplayed in a new matrix of cakes where the attributes assigned to that level of detail are used as the axes.

In FIG. 6, a decision table pane display view 615 is shown, where cake 614, corresponding to odor=none and spore print color=white, has been expanded to show a greater level of detail. This greater level of detail is found on a lower (i.e., less aggregated) level of the decision table. In this example, the next level of detail involves two additional attributes, habitat and population. In addition, cake 614 now comprises a 6×7 matrix of cakes based on these additional attributes. The 6×7 cake matrix is shown in more detail in the zoom-in of cake 614, shown in FIG. 7 as cake matrix 714.

According to the present invention, the cake charts sit on top of a gray base. If the base is completely covered with cakes, then every combination of values at this level is represented by the data. Often much of the base is uncovered. This shows regions where no data exists. In a very sparse dataset there are large regions that are empty Picking or selecting a gray base has the same effect as selecting the cake that was one level up in level of detail. Selecting on a base causes every cake sitting on top of it to expand to the next level of detail.

Further, if cake 614 has been selected for drill-down, then the resulting label probability pane will show a label probability pane display view 625, which corresponds to a posterior probability distribution which exactly matches that shown by the cake. When more than one cake chart in decision table pane 510 is selected (e.g., by implementing a Shift-left mouse click), then the pie in label probability pane 520 will show the probability distribution (with respect to the label) for the set of records defined by the union of selected cakes It is also possible to select a whole group of cakes by selecting; the gray base below them. This has the same effect as selecting the cake one level up (toward the top level) in the hierarchy. In this way it is not only possible to extract predicted values based on the model, but it is also possible to define a query for drilling through to the underlying data.

In a preferred embodiment, classes are listed under the pie chart (see e.g., label probability pane display view 520), and are in order of slice size. The class with the largest probability is at the top. As values on decision table pane 510 are selected, this order changes to reflect the changing probability pie. The class that would be predicted given current selections is shown at the top. If the label is a binned attribute, the order of the classes is not changed on slice size. In a preferred embodiment, if the label is a binned attribute, colors are assigned according to a continuous spectrum: e.g., the highest bin is red, otherwise, random colors are used.

Figure 8:
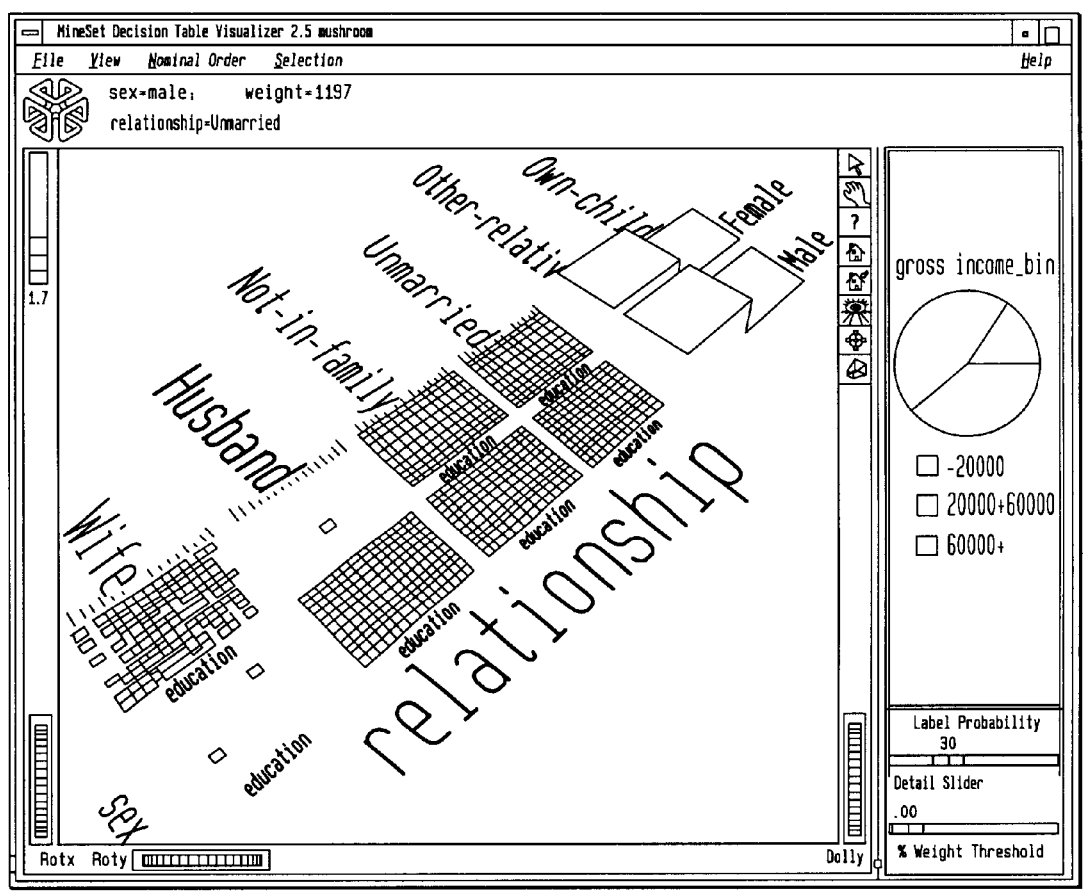
FIGS. 8 and 9A include a decision table pane on the left and a label probability pane on the right showing decision table claasifier information for an example census database.

Another example of the visualization tool of the present invention is shown in FIG. 8 which depicts the structure of a decision table classifier induced from known census data containing fifteen attributes, and about 50,000 records. Here the income attribute (which has been binned into three ranges) has been selected as the class label. The attributes selected at level one are: relationship and sex; level two has education and occupation; and level three has hrs_wk (hours worked per week) and age.

At the top level, relationship and sex have a strong correlation. Surprisingly, there are three male wives and one female husband (indicating a possible data quality problem). The user can see distinct weight (number of records) and salary (label value) distributions for each combination of sex and relationship. The weight distribution is readily determined by viewing the relative heights of the cake charts. The salary distribution for the combination of sex and relationship is readily determined by viewing the sizes of the colored slices on the top of the cake charts.

FIG. 8 shows that there is a significant difference between distributions for unmarried males versus females. There is a cluster of dark cake charts in the lower left of the male matrix that does not exist in the female matrix. The female matrix has obvious spikes at occupation="admin-clerical" and "other service". No such spikes are visible in the corresponding male matrix.

FIG. 9A shows the result of drilling down on the base for male husbands. A user can compare the salary distributions (gross income) for HS-grad (high school graduate) husbands who are in sales with those who are executive managers (these two regions are have been selected in FIG. 9A). Although the distribution of age and hours worked is similar, the label probability pane of FIG. 9A shows that the probability of having an income greater than 60,000 class is 34% for this group of managers, compared with 27% for the salesmen.

According to another feature of the present invention, a user can "drill-through" to obtain raw data for the decision table. The records in FIG. 9B show the result of drilling through on these two selected regions of FIG. 9A. In FIG. 9B, the records of the decision table are displayed. Alternatively, if implemented in a MineSet™ operating environment, a user can "drill-through" by selecting a Tool Manager option, which puts a filter expression into the Tool Manager history. Subsequently, other tools can be used on that subset of the data.

As discussed above, an important feature of the present invention is that the distribution in each cake can be displayed as a straight probability distribution (based on the record weights) or as a conditional probability distribution. For example, in FIG. 10A, which is based on the census data set, the label is race and the distribution of the data is based on weight. Because most records in this data set are labeled race="white," it is difficult to discern what values give evidence for other races.

Figure 10B:
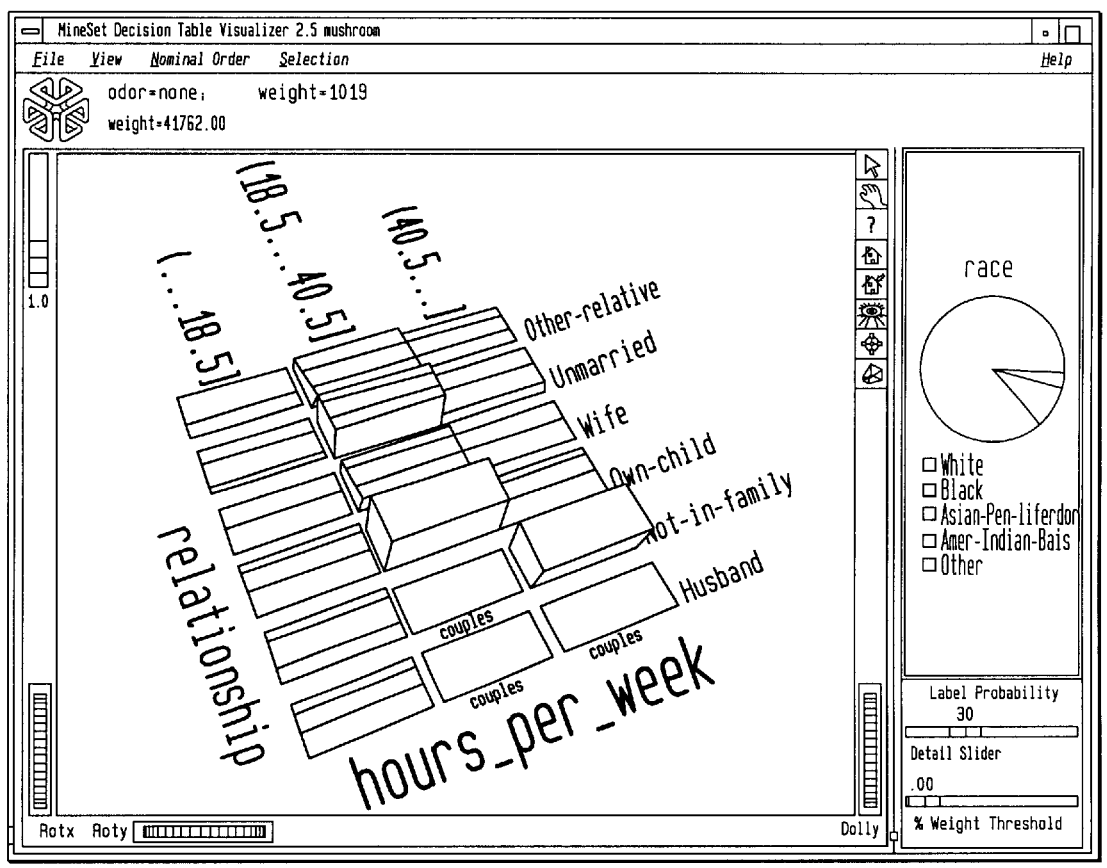
FIG. 10B shows a display of a conditional probability distribution.

With the visualization tool of the present invention, a user can switch to an evidence mode display as shown in FIG. 10B. The display of normalized conditional probabilities is shown at each cake. FIG. 10B shows that if the racial breakdown at a particular cake matches the prior probability shown in the label probability pane, then the slices will be of equal size.

The above examples of FIGS. 5–10B are visualizations of decision table classifiers. According to the present invention, other data structures, such as OLAP structures, can be visualized in a similar manner, as would be apparent to one of skill in the art given the present description.

(v) Building a Scene Graph

Returning to FIG. 4, method 400 describes how to implement the present invention. According to one feature of the present invention, a scene graph can be constructed in step 432. According to another feature of the present invention, in step 434, a scene graph can be built adaptively to enable interactions with and display of different levels in a data structure hierarchy.

The terminology used herein is consistent with the known "Open Inventor" language or Virtual Reality Modeling Language (VRML), each developed in part by Silicon Graphics, Inc. In its simplest form, a scene graph is a structure defined in Open Inventor™ or VRML. The scene graph is epresented as a structure diagram that contains a plurality of lines connecting one or more nodes.

In a preferred embodiment, Open Inventor™ (or Inventor™) language is utilized. The nodes are also referred to in Open Inventor™ terminology as objects and transformations. In this environment, collections of simple objects can be grouped together to form a more complex object, in which case the node for the complex object is referred to as the parent node and the simple objects are referred to as child nodes. For example, as shown in FIG. 11C, node "B" is a child of node "A." Node "B" is also a parent of node "C." Once a scene graph is built, a visualization program, such as a viewer program, can be used to render the scene so that a user can view it.

Figure 11A:
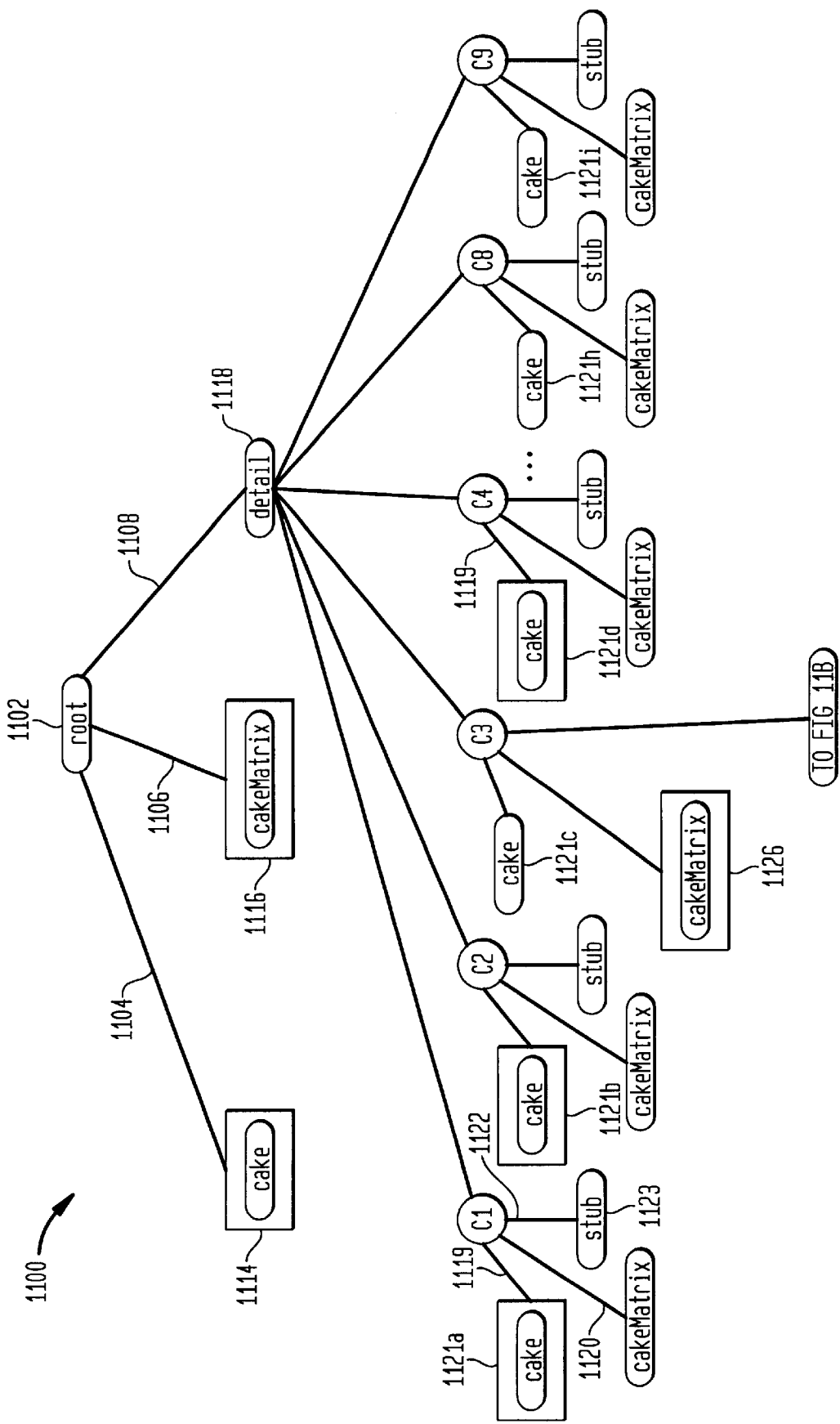
FIGS. 11A and 11B show the structure of an adaptively built scene graph according to one embodiment of the present invention.
Figure 11B:
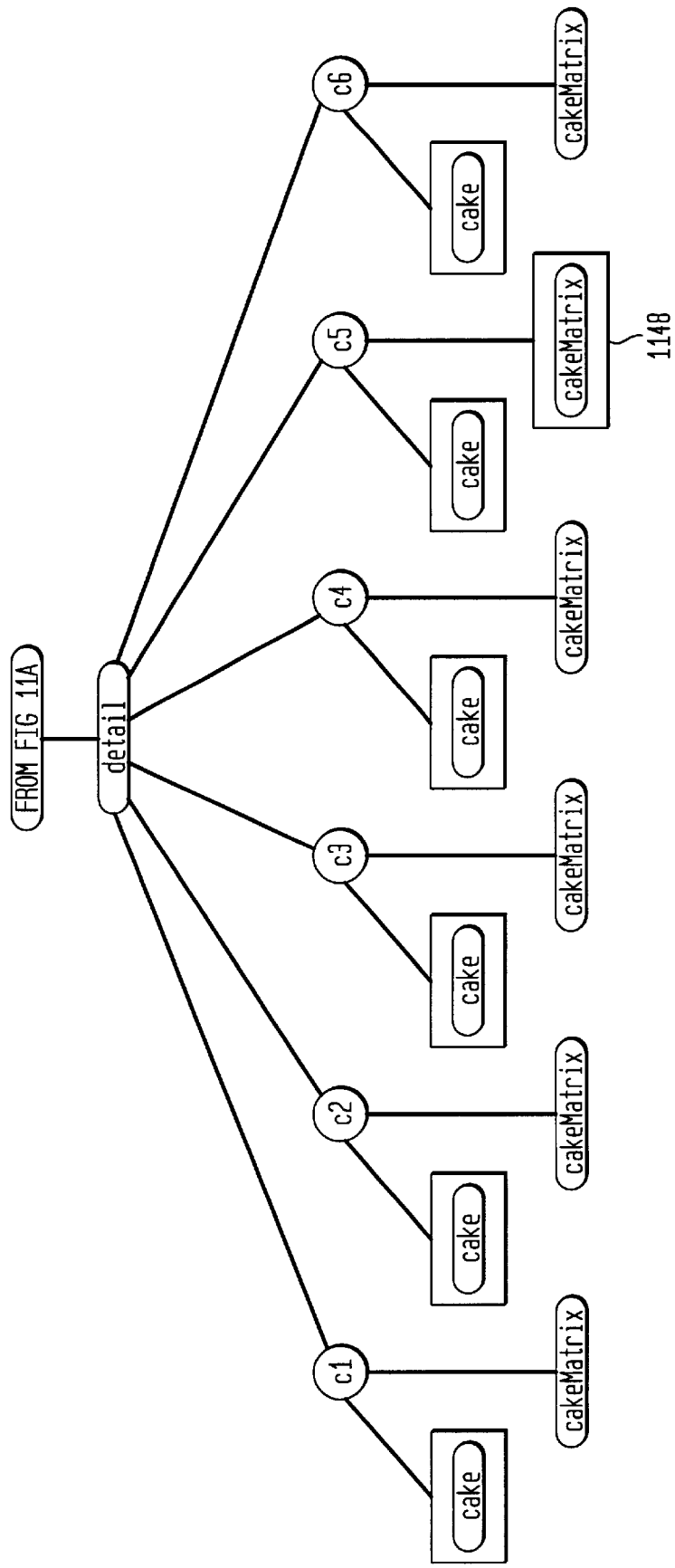
Figure 11C:
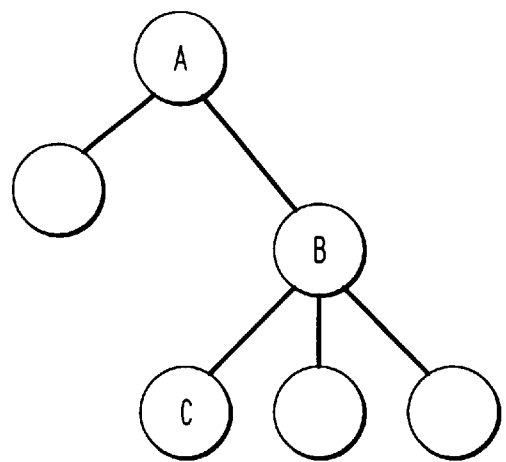
FIG. 11C shows the relation between nodes in an example scene graph structure.

An example of how to adaptively build a scene graph according to an example implementation of the present invention is depicted in FIGS. 11A–B for a decision table classifier. FIGS. 11A and 11B show a partial scene graph structure 1100. According to the present invention, the scene graph for the whole decision table is not constructed at one time. In a prefirred embodiment, only the top one or two levels are created initially. Otherwise, in order to visualize every level of detail, an enormous scene graph would have to be rendered. Such a scene graph would take hours to construct, even using the fastest available graphics processor. According to the present invention, utilizing adaptive scene graph generation allows a user to use interactive techniques, such as drill-down, drill-up, and drill-through in order to obtain valuable information from the decision table classifier Lower levels of detail are created as users drill-down.

FIGS. 11A and 11B show a representation of an adaptively built scene graph according to a preferred embodiment of the present invention. In this example, the data visualized corresponds to the "monk" data set, which is well known in machine learning. In this example, various attributes are utilized to determine whether a person is a monk or not.

In FIG. 11A, scene graph structure 1100 represents a scene graph that can be directly rendered on a display screen or transmitted over a network for later display. Scene graph structure 1100 can be created in any suitable computer programming language, such as C++ or Java. This scene graph structure is then traversed to perform the rendering. In this example, a root 1102 has three distinct branches: branch 1104, branch 1106, and branch 1108. Branch 1104 connects root 1102 to cake 1114. Branch 1106 connects root 1102 to cakeMatrix 1116. Branch 1108 connects root 1102 to detail node 1118. From detail node 1118, scene graph structure 1100 branches down into further levels of detail, represented by nodes C1–C9, and so on. Each node C1–C9 branches into a cake, a cakeMatrix, and a stub or detail node.

Branch 1119 connects node C1 to cake 1121a, branch 1120 connects node C1 to cakeMatrix 1120, and branch 1122 connects node C1 to stub 1123. A node that is termed a "cake" corresponds to a graphical representation of a given level of a decision table. A node that is termed a "cakeMatrix" corresponds to the next lower level of detail in the decision table that is represented by the higher level cake. The term "stub" is used to denote an unexpanded branch in the scene graph.

A stub exists in the scene graph structure until a user determines that exploration of that portion of the scene graph is desired. If a stub is encountered during drill down, it alerts the computer system that a geometry has not been created for what the user desires to view. This triggers the system to automatically generate that portion of the scene graph, which has a corresponding level of the decision table. The stub node is then replaced by the newly generated geometry. When a user drills down on a cakeMatrix, this alerts the system to generate the next portion of the scene graph, thus replacing the stub node. In contrast, a "detail" node has actual data already stored in memory for that portion of the scene graph.

Figure 12:
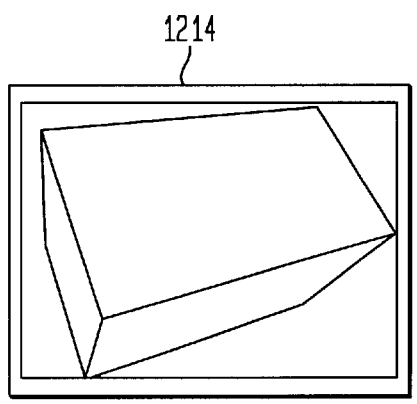
FIG. 12 shows an example visualization of a cake corresponding to a top level of a decision table.

Cake 1114 corresponds to a single rectangular graphical representation, or "cake," that has been visually rendered as cake 1214 in FIG. 12. Box 1114 (and corresponding cake 614) corresponds to the highest level (or most aggregated level) of the decision table. This level is also referred to herein as the root node. An example of such a decision table level is shown in Table 3, described above. Because only one row of data is present in Table 3, only one cake is rendered. In a preferred embodiment, only this single node corresponding to the top level of the decision table is shown. Nothing else is being drawn or rendered, even though everything else is still in the scene graph. Note that cake 1214 has two slices, each of a given width. As mentioned above, the width of the slices corresponds to the Probability column of the corresponding decision table. In this example, the "red" slice corresponds to "yes" (the subject is a monk), and the blue slice corresponds to "no" (the subject is not a monk). Cake 1214 also has a height that corresponds to the weight column of this level of the decision table. In this example, the "weight" corresponds to the sum of the records with those attributes.

Figure 13:
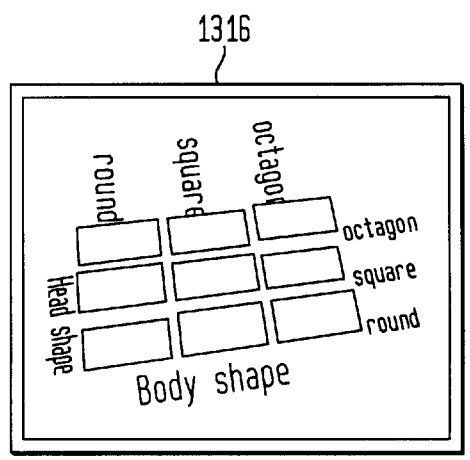
FIG. 13 shows an example visualization of a cakematrix corresponding to a lower level of a decision table.

Branch 1106 corresponds to cakeMatrix 1116, which is visualized in FIG. 13. CakeMatrix 1316 is generated as a result of a drill-down from cake 1114. CakeMatrix 1316 corresponds to the next lowest level of the decision table. In other words, root 1102 is acting as a switch node. Thus, when a user drills down on cake 1214, the visualizer switches from showing cake 1214 to showing cakeMatrix 1116, which corresponds to cakeMatrix 1316 of FIG. 13.

According to a preferred embodiment of the present invention, the efficiency of the visualization tool is increased when a single cakeMatrix object is used to render the scene in 1316, instead of nine separate cake objects. In this example, cakeMatrix 1316 visualizes two main attributes of the data set, body shape and head shape. One of the important features of the present invention is that the visualization often times shows the strong correlation or other interactions between attributes. For example, FIG. 13 shows the strong dependence between head shape and body shape: when the head shape and body shape are the same, it is highly probable that the subject is a monk.

As discussed above, when a user wishes to explore a cake in more detail, the user can graphically drill-down to a more detailed level of the decision table. This greater level of detail is represented by detail node 1118. Detail node 1118 branches into nine distinct nodes (nodes C1–C9). Each of nodes C1–C9 of FIG. 11A has a left child, i.e., cakes 1121a–1121i, which respectively correspond to the nine cakes shown in FIG. 13. In other words, each of the individual nine cakes shown in FIG. 13 becomes a separate cake node. For example, a user viewing cakeMatrix 1316 in FIG. 13 is only viewing a matrix of cakes. If the user wishes to view a more detailed level of the decision table (e.g., for any one or more of nodes such as node C3 (1128) of FIG. 11A), the user can drill down on one or more cakes. The resulting visualization is shown in FIG. 14.

Figure 14:
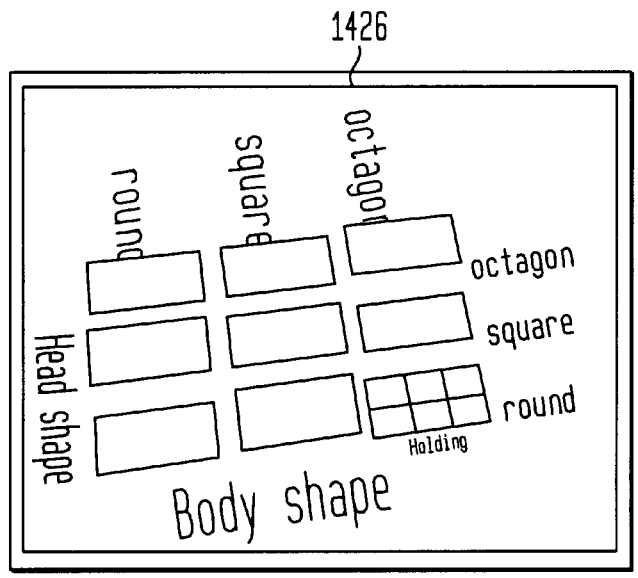
FIG. 14 shows an example visualization of the cakematrix from FIG. 13 with one cake showing greater levels of detail as a result of a drill-down, corresponding to a lower level of a decision table.

Visualization 1426, as shown in FIG. 14, corresponds to cakeMatrix 1126 of FIG. 11A. In this example, the specific cake representing head shape=round, body shape=octagon corresponds to node C3 (1128) of FIG. 11A. Visualization 1426 depicts nodes C1, C2, and C4–C9 as individual cakes, and node C3 as a cakeMatrix 1126, which contains six separate cakes. The six separate cakes are shown as nodes c1–c6 in FIG. 11B.

In FIG. 14, the cake matrix 1126 from FIG. 11A is rendered corresponding to two further attributes of the decision table, in this case holding and is smiling. In this example, there are three possible values for holding, and two possible values (yes and no) for is smiling. Because the attributes are written in small text in this example (to avoid visual clutter on the screen), a user can display the attributes on the legend by one of several techniques. In a preferred embodiment, a user would move the cursor over the attributes to display them on screen, such as in legend 590 of FIG. 5.

Figure 15:
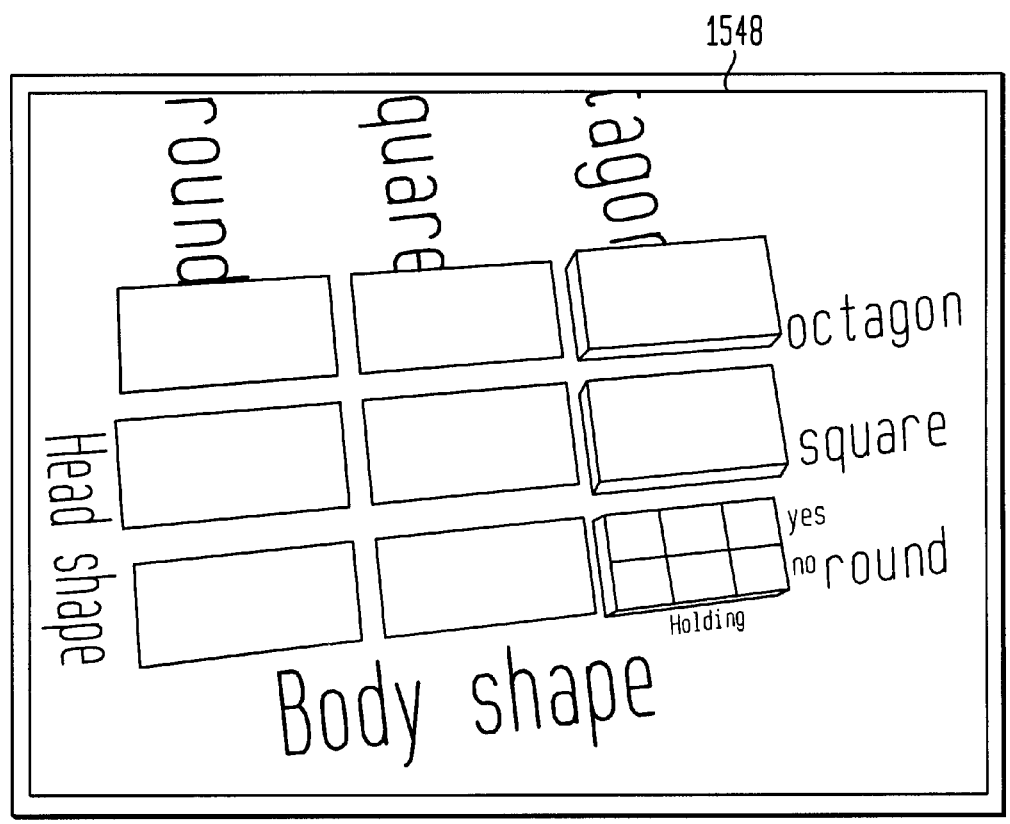
FIG. 15 shows example visualization of the cakematrix from FIG. 14 with one cake showing even greater levels of detail as a result of a further drill-down, corresponding to an even lower level of a decision table.

If the user wishes to view a more detailed level of the decision table starting from visualization 1426 from FIG. 14 (e.g., for any one or more of nodes data file in other operating environments according to step 410 of FIG. 4. cakes. The resulting visualization is shown in FIG. 15 as visualization 1548. In other words, cakeMatrix 1148 is blown up into a further level of detail in FIG. 15, where cakeMatrix 1148 is rendered as five smaller cakes in visualization 1548. Note also that several sites, represented as gray-scale, are interposed between the five smaller cakes in visualization 1548. As mentioned above, a user can drill-up on the gray-scale and a higher level of the decision table would be shown. According to the present invention, a user could continue to drill down on one or more of the smaller cakes shown in FIG. 15. As a result that particular cakeMatrix would be replaced by a new detail structure in the tree of FIGS. 11A and 11B. Further, the detailed structure in the tree would be automatically generated before display.

As FIGS. 11A–11B show, the tree structure can continue on for many more levels of the underlying decision table. The visualizations shown in FIGS. 12–15 show only one path out of many possible paths that can be taken by a user. According to the present invention, this type of adaptiv e scene graph construction provides a practical way for a user to view the information of interest. Otherwise, by displaying all the paths simultaneously, the user would be inundated with a great deal of information, making the prediction sought much more difficult. Moreover, the time it would take to construct the entire scene graph at one time would be enormous, even with the most sophisticated of computer systems.

5. Data Structure Visualizer System

Figure 16:
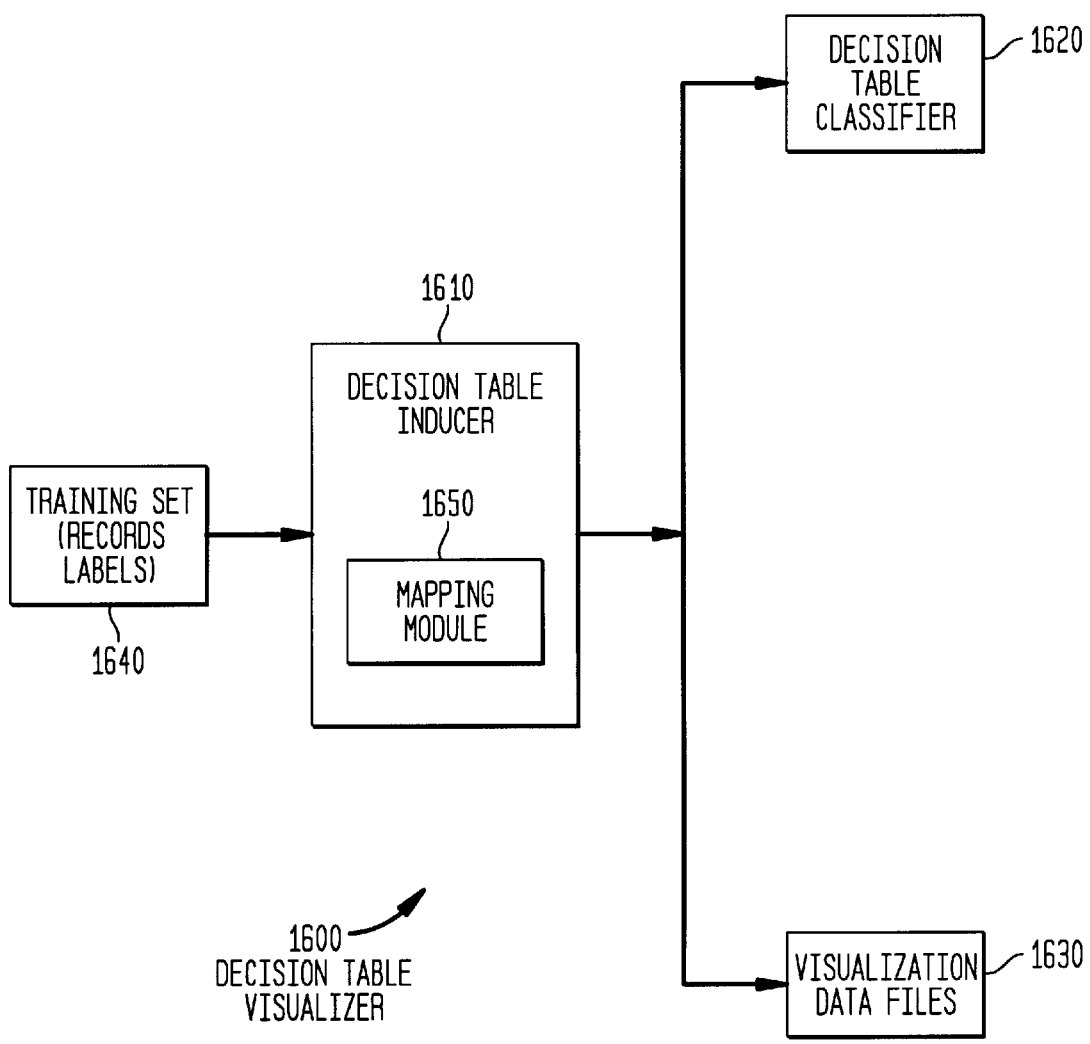
FIG. 16 is a schematic diagram showing a system for visualizing a decision table classifier, according to the present invention.

FIG. 16 is a schematic diagram showing a data structure visualizer 1600 for visualizing a data structure, such as a decision table classifier, according to the present invention. The elements of data structure 1600 are described with respect to a decision table classifier implementation for example purposes only.

An inducer 1610 constructs decision table classifier 1620 based on a training set 1640. Decision table inducer 1610 further includes mapping module 1650. Mapping module 1650 generates visualization data files 1630 for use in a decision table classifier visualization tool, as described above with respect to FIGS. 5–15.

Figure 17:
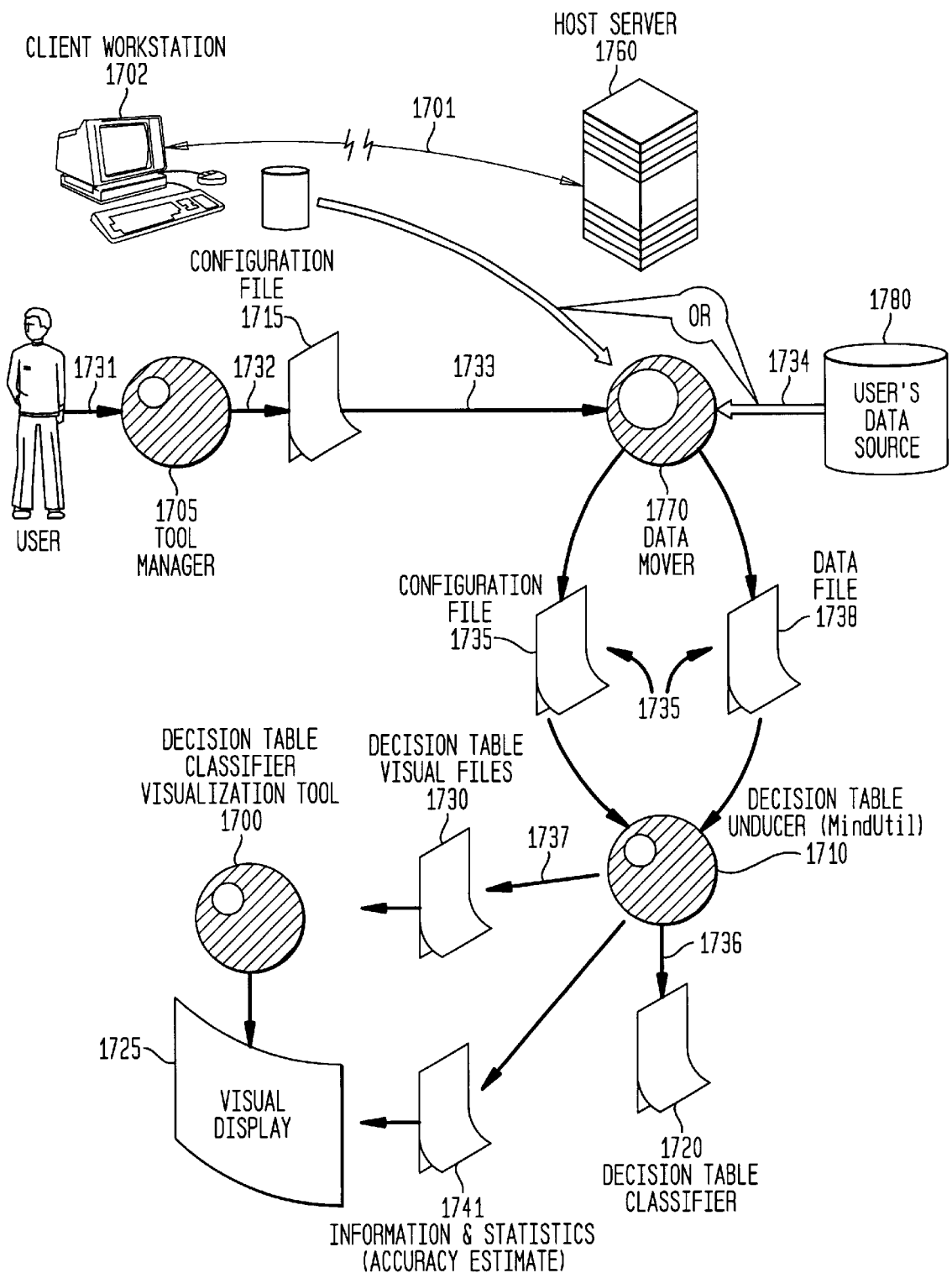
FIG. 17 shows an example client/server network implementing the visualization tool of the present invention.

FIG. 17 shows an example client/server network implementing data structure visualizer 1600. A client workstation 1702 communicates over a data link 1701 with a host server 1760 as part of a local area network (LAN), intermediate-area network, wide-area-network (WAN), or other network type configuration. Any data communication protocol can be used to transport data.

The client workstation 1702 includes a computer system. For example, the computer system can be, but is not limited to, computer system 1600 as described below with respect to FIG. 16. Workstation 1702 runs a tool manager 1705 for managing operation of data structure visualization tool 1700. Visual display 1725 is coupled to decision table classifier visualization tool 1700 for providing graphical-user interface inputs and outputs to decision table classifier visualization tool 1700.

In one preferred embodiment, tool manager 1705 and decision table classifier visualization tool 1700 are software algorithms executed on workstation 1702. Host server system 1760 includes a host processor and a data source 1780. Data mover 1770 and decision table inducer 1710 are included at the host server 1760, and preferably, are implemented in software executed by the host server 1760.

FIG. 17 further illustrates the flow of a data structure visualization tool execution sequence through steps 1731–1739 for a decision table classifier. First, a user logs onto the client workstation 1702 and opens tool manager 1705 (step 1731). Through the tool manager 1705, the user can select and configure decision table classifier visualization tool 1700. A configuration file 1715 must be set-up which identifies the content to be displayed in a data visualization and appropriate external dimension ranges. To facilitate this process, predefined preference panels, templates and/or data palettes can be accessed through menu-driven commands and pop-up display windows to permit the user to easily define the content of a decision table classifier visualization.

At the host server 1760, data mover 1770 extracts data from the data source 1780 corresponding to the configuration file 1715 (step 1734). A configuration file 1739 and data file 1738 are made available to decision table inducer 1710 by data mover 1770 (step 1735). Decision table inducer 1710 generates decision table classifier 1720 (step 1736). Decision table inducer 1710 generates decision table visualization data files 1730 for use and further modification by decision table classifier visualization tool 1700 (step 1737). Decision table inducer 1710 also generates an information and statistics report file 1741 for display.

Figure 18A:
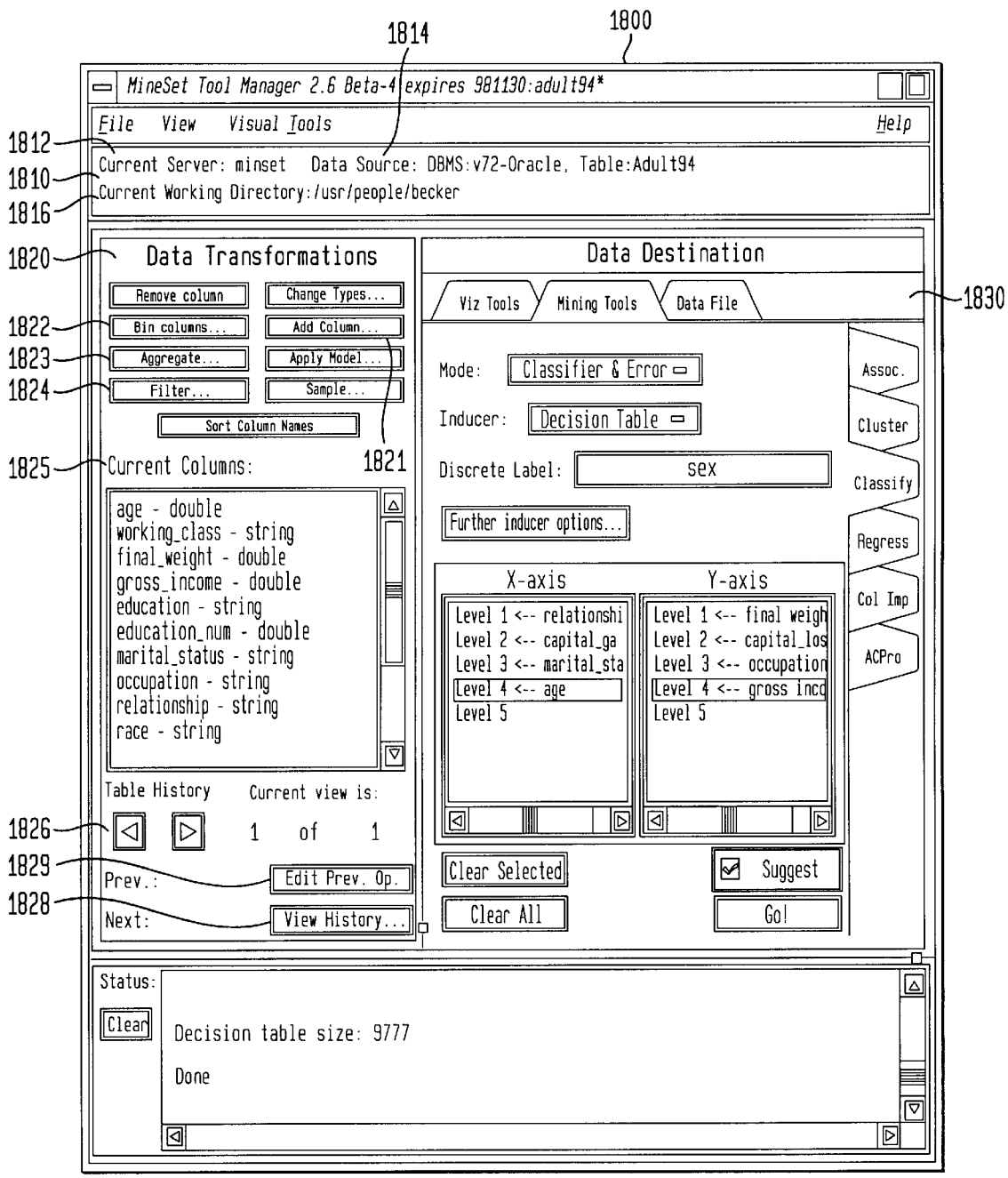
FIG. 18A shows a data transformation and destination panel for defining a decision table inducer according to the present invention.
Figure 18B:
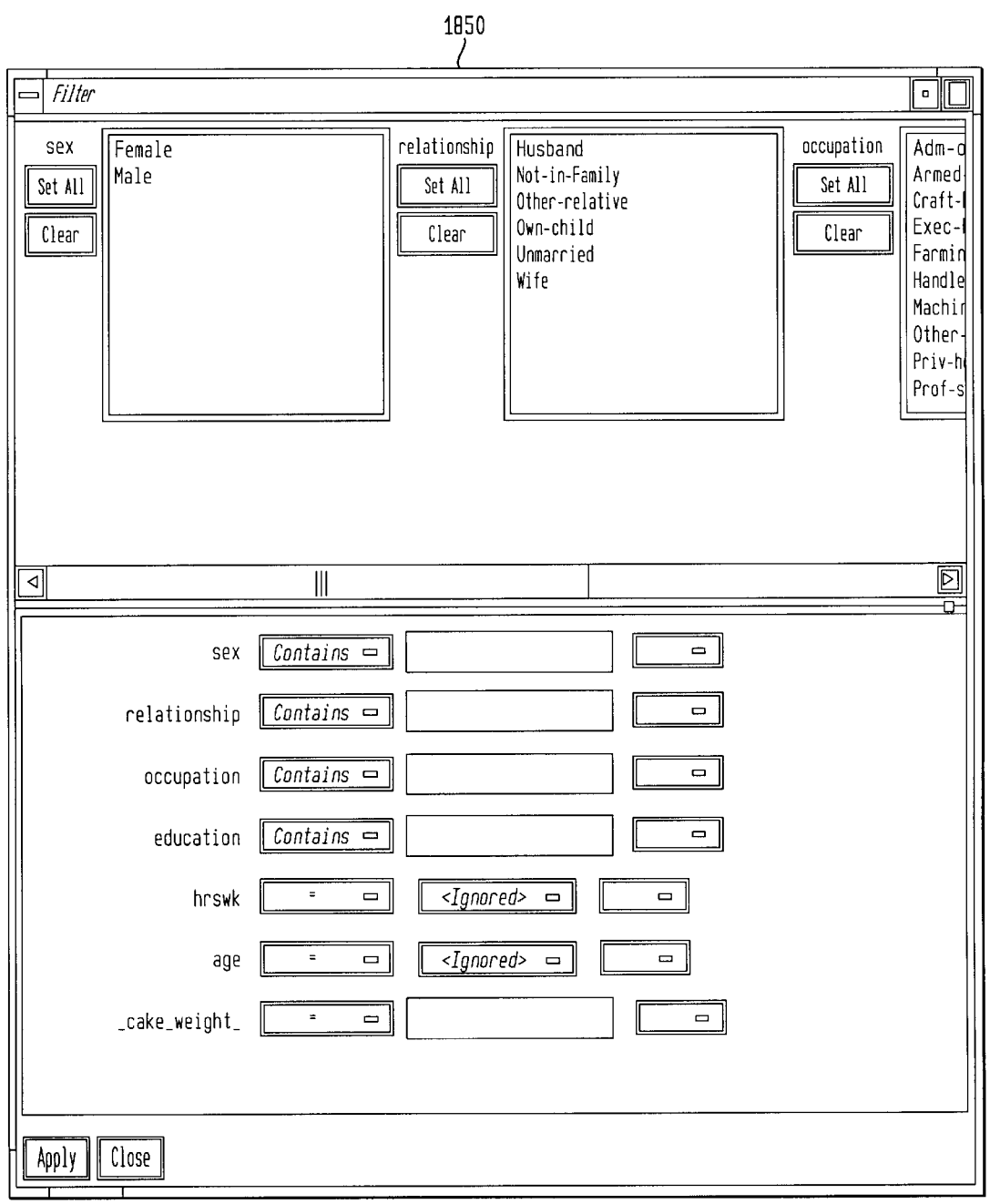
FIG. 18B shows an example filter panel according to the present invention.
Figure 19:
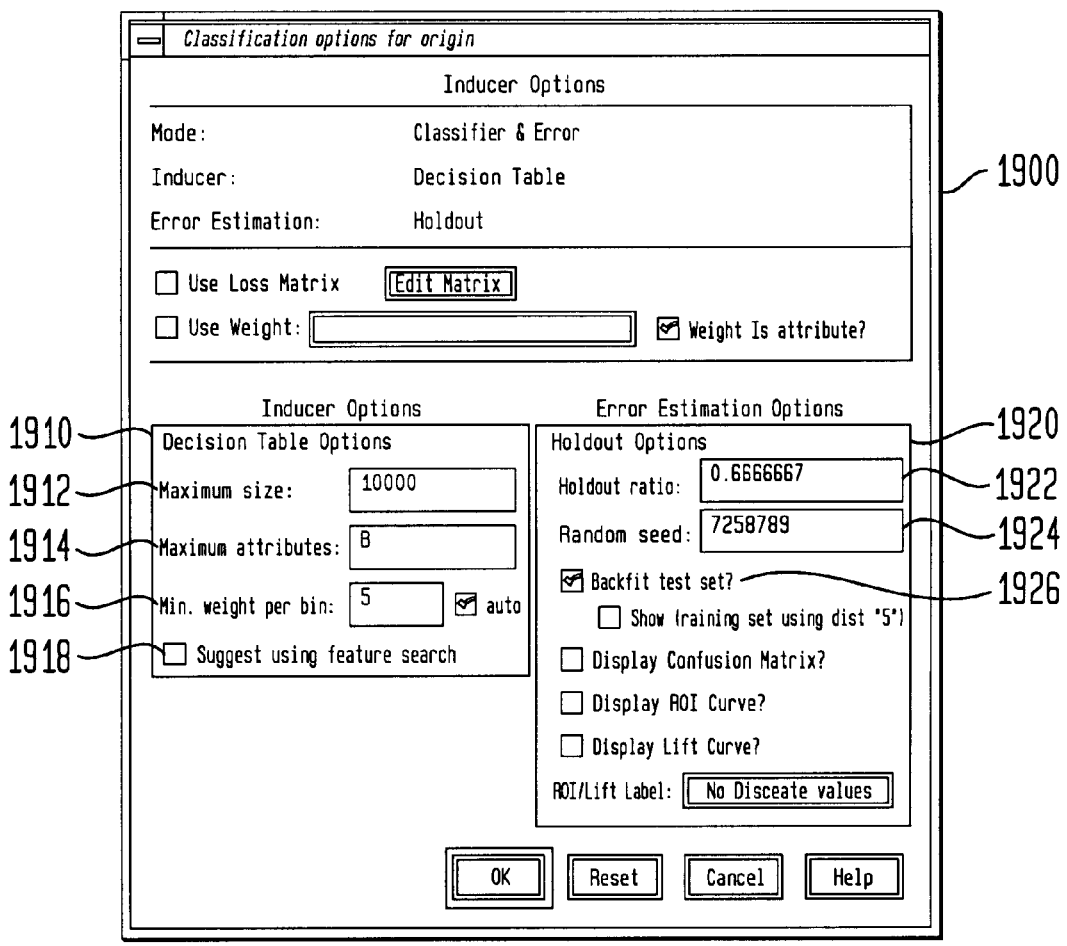
FIG. 19 shows a panel for defining further decision table inducer options according to the present invention.

According to a further feature of the present invention, a graphical-user-interface is used to provide parameters for defining training set 1640 and setting decision table inducer options (FIGS. 18–19). The graphical user-interface for data transformation is provided in tool manager 1705.

FIG. 18 shows a data panel 1800 having data manipulation panels 1820 and 1830 that permit a user to construct a configuration file 1715. For brevity, only main functions of panels 1820 and 1830 are described here. Other functions can be added as would be apparent to one skilled in the art given this description.

In legend 1810, current server window 1812 identifies a server name containing data to be analyzed. Data source window 1814 identifies particular database management systems, databases and data files to used in a decision table classifier visualization. A current working directory 1816 is also displayed in legend 1810.

Data transformation panel 1820 is used to define data transformations to be performed on the data to define a training set 1640 before running decision table inducer 1610, 1710. Most operations are applied to columns of data. For example, Add Column option 1821 lets a user create a new column based on other columns. Bin Columns option 1822 is a data transformation where numerical values in a column are grouped into ranges, e.g., grouping ages into 5-year age groups. Other data transformation operations can be performed including aggregating data, and filtering (options 1823 and 1824, respectively). For example, a filter panel 1850 is shown in FIG. 18B for the "adult" data set. Filter panel 1850 allows a user to select attribute values of inierest and remove some or all other values within the attributes from the display.

Current Columns window 1825 lists the columns available to be included in training set 1640. Initially, this is the set of columns in the original data. The selected data transformations can add, remove, or modify one or more columns.

Successive data transformations form a "history." The Table History arrow buttons 1826 let a user move back and forth in this history. Current Columns window 1825 and Current View indicator 1827 reflect a user's current position in the table history. Edit History option 1828 brings up a new window where the entire history is displayed visually allowing edits, insertions, or removal of data transformations. Edit Prev Op option 1829 lets a user edit the previous transformation Data destination panel 1830 permits a user to perform many operations, including creating visualizations based on the chosen data, interacting with or mining the data for associations rules (as discussed above), creating classifiers (such as a decision table classifier) based on the data, and/or finding important columns in the data. In a preferred embodiment of the present invention, a decision table inducer, a decision-tree inducer, or an evidence inducer can be configured. In this way, an integrated data mining system for visualizing a decision table classifier, an evidence classifier, and a decision-tree classifier is realized.

The present invention allows a user to inducer 1610, 1710 depending upon design goals, as seen in FIG. 19. When a data structure is built, such as a decision table classifier, it is useful to know how well a user can expect to perform in the future (how accurate its classification will be). Factors affecting error estimation (also referred to as classification accuracy) include the following:

The number of records available in the training set.
Since the inducer must learn from the training set, the larger the training set, the more reliable the classifier should be; however, the larger the training set, the longer it takes the inducer to build a classifier. The value of the improvement to the accuracy may decrease as the size of the training set increases (this is a case of diminishing returns).

The number of attributes.
More attributes mean more combinations for the decision table inducer to compute, making the problem more difficult for the inducer and requiring more time. If an attribute is irrelevant to the task, it can removed from the training set (this can be done using Tool Manager 1705). Removing unnecessary attributes can avoid random correlations which can lead an inducer astray to build a less accurate classifier (technically, this known as "overfitting").

The information in the attributes.
Sometimes there is not enough information in the attributes to correctly predict the label with high accuracy (for example, trying to determine someone's salary based on their eye color). Adding other attributes (such as profession, hours per week, and age) might increase the accuracy).

The distribution of future unlabeled records.

If future records come from a distribution different from that of the training set, the accuracy will probably be low. For example, if a user builds a classifier to predict something from a training set containing family cars, it may not be useful to classify records containing many sport cars because the distribution of attributes can be very different.

Two common methods for estimating the accuracy of a classifier are described below. Both of these assume that future records will be sampled from the same distribution as the training set.

Holdout: A portion of the records (commonly two-thirds) is used as the training set, while the rest is kept as a test set. The inducer is shown only two-thirds of the data and builds a classifier. The test set is then classified using the induced classifier, and the accuracy on this test set is the estimated accuracy. This method is fast, but since it uses only two-thirds of the data for building the classifier, it does not make efficient use of the data for learning. If all the data were used, it is possible that a more accurate classifier could be built.

Cross-validation: The data is split into k mutually exclusive subsets (folds) of approximately equal size. The inducer is trained and tested k times; each time, it is trained on all the data minus a different fold, then tested on that holdout fold. The estimated validation can be repeated multiple times (t). For at times k-fold cross-validation, k*t classifiers are built and evaluated. This means the time for cross-validation is k*t times longer. by default, k=10 and t=1, so cross-validation takes approximately 10 times longer than building a single classifier. Increasing the number of repetitions (t) increases the running time and improves the accuracy estimate and the corresponding confidence interval.

A user can increase or decrease k. Reducing it to 3 or 5 shortens the running time, however, estimates are likely to be biased pessimistically because of the smaller training set sizes. A user can increase k, especially for very small dai a sets.

Generally, a holdout estimate should be used at the exploratory stage, as well as on very large data sets. Cross-validation should be used for the final classifier building phase, as well as on small data sets.

In addition, back-fitting a decision table classifier is also useful in error estimation. Back-fitting a decision table classifier with a set of records does not alter the structure of the classifier, but updates the probability estimates based on the given data. A structure can be built from a small training set and can then be back-fitted with a larger data set to improve the probability estimates. Back-fitting is typically a faster process than inducing the decision table classifier's structure. Moreover, when holdout error estimation is used, a portion of the data (also referred to as a test set) can be left out for testing. Once the decision table classifier structure is induced and the error estimated, it is possible to back-fit all of the data through the structure, which can reduce the error of the final decision table classifier. When counts, weights, and probabilities are shown in the decision table classifier's structure, they reflect all the data, not just the training set portion. In a preferred embodiment, when using a drill-through from the decision table classifier visualizer, a user can see data corresponding to the weights shown, which reflect the entire data set, If back-fitting is not used, the weights shown represent only the training set.

FIG. 19 shows a panel 1900 for further inducer options that can be selected from panel 1800 to tailor inducer 1610, 1710. In a preferred embodiment, to fine-tune the decision table induction algorithm, a user can change the following options shown in option panel 1910. Maximum size 1912 is used when a user is confronted with a very large dataset. A default limit can be set (e.g., 10,000 nodes) which corresponds to the number of cakes shown in the visualization. Limiting the number of nodes speeds up the induction process and limits the storage required. Although restricting the size can decrease the run time, it may increase the error rate.

Maximum attributes 1914 can be used to determine how many different columns a user allows to participate in the decision table when searching. Limiting the attributes simplifies the result and speeds its arrival. This limit affects only columns added by the Suggest mode 1918. Columns may also be added manually, and these are not subject to the limit.

Maximum weight per bin 1916 is used to define the minimum number of instances per bin. The automatic setting calculates this number based on the dataset size. Typically, the larger the data set, the larger the bin size. If the data set is very large, the number of bins can be reduced by raising this value.

Error estimation options panel 1920 is used to explore the accuracy of the prediction model. As discussed above, it is useful to know how accurate a given classification will be. Using this option, a user can see a random seed 1924 that determines how the data is split into training and testing sets. Changing the random seed causes a different split of the data into training and test sets. If the accuracy estimate varies appreciably, the induction process is not stable. In addition, a user can set the Holdout Ratio 1922 of records to keep as the training set. This defaults to 0.6666 (two-thirds). The rest of the records are used for assessing the accuracy. A user can also choose to back-fit a test set with option 1926. Other options can be present will be apparent to those of skill in the art given the present description.

6. Example GUI Computer Environment

Figure 20:
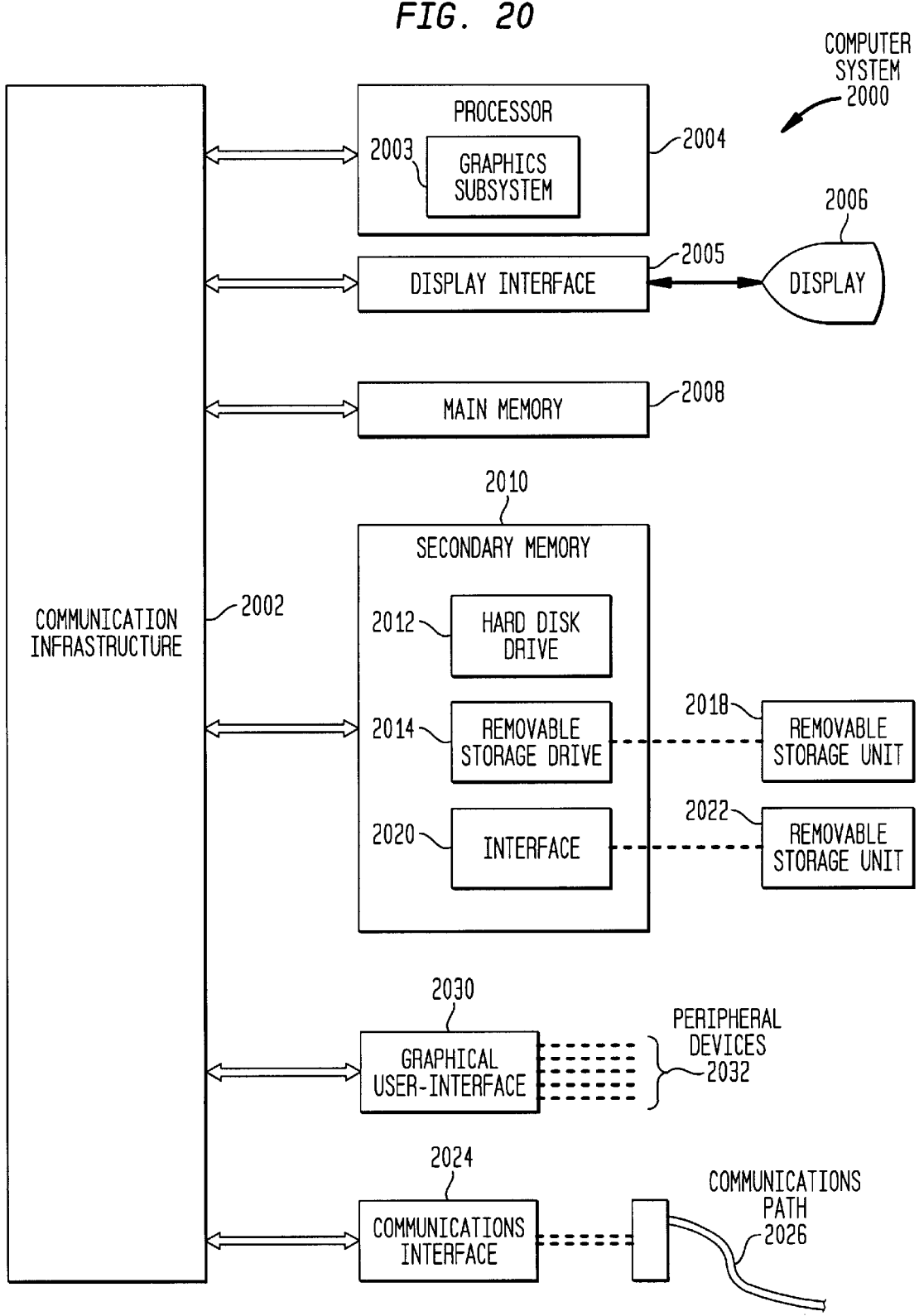
FIG. 20 shows an example graphical user-interface computer system for implementing a decision table classifier visualization tool according to the present invention.

FIG. 20 is a block diagram illustrating an example environment in which the present invention can operate. The environment is a computer system 2000 that includes one or more processors, such as processor 2004. The processor 2004 is connected to a communications infrastructure 2002 (e.g., network, cross-bar switch, or a bus). Various software embodiments are described in terms of this example computer system. After reading this description, it will be apparent to a person skilled in the relevant art how to implement the invention using other computer systems and/or computer architectures.

Computer system 2000 includes a graphics subsystem 2003. Graphics subsystem 2003 can be implemented as one or more processor chips. The graphics subsystem 2003 can be included as part of processor 2004 as shown in FIG. 20 or as a separate graphics engine or processor(s). Graphics data is output from the graphics subsystem 2003 to the bus 2002. Display interface 2005 forwards graphics data from the bus 2002 for display on the display unit 2006. This graphics data includes graphics data for the screen displays described herein.

Computer system 2000 also includes a main memory 2008, preferably random access memory (RAM), and can also include a secondary memory 2010. The secondary memory 2010 can include, for example, a hard disk drive 2012 and/or a removable storage drive 2014, representing a floppy disk drive, a magnetic tape drive, an optical disk drive, etc. The removable storage drive 2014 reads from and/or writes to a removable storage unit 2018 in a well known manner. Removable storage unit 2018 represents a floppy disk, magnetic tape, optical disk, etc., which is read by and written to by removable storage drive 2014. As will be appreciated, the removable storage unit 2018 includes a computer usable storage medium having stored therein computer software and/or data.

In alternative embodiments, secondary memory 2010 may include other similar means for allowing computer programs or other instructions to be loaded into computer system 2000. Such means can include, for example, a removable storage unit 2022 and an interface 2020. Examples can include a program cartridge and cartridge interface (such as that found in video game devices), a removable memory chip (such as an EPROM, or PROM) and associated socket, and other removable storage units 2022 and interfaces 2020 which allow software and data to be transferred from the removable storage unit 2022 to computer system 2000.

Computer system 2000 can also include a communications interface 2024. Communications interface 2024 allows software and data to be transferred between computer system 2000 and external devices via communications path 2026. Examples of communications interface 2024 can include a modem, a network interface (such as an Ethernet card), a communications port, etc. Software and data transferred via communications interface 2024 are in the form of signals which can be electronic, electromagnetic, optical or other signals capable of being received by communications interface 2024, via communications path 2026. Note that communications interface 2024 provides a means by which computer system 2000 can interface to a network such as the Internet.

Graphical user interface module 2030 transfers user inputs from peripheral devices 2032 to bus 2006. These peripheral devices 2032 can be a mouse, keyboard, touch screen, microphone, joystick, stylus, light pen, or any other type of peripheral unit. These peripheral devices 2032 enable a user to operate and control the decision table classifier visualization tool of the present invention as described herein.

The present invention is described in terms of this example environment. Description in these terms is provided for convenience only. It is not intended that the invention be limited to application in this example environment. In fact, after reading the following description, it will become apparent to a person skilled in the relevant art how to implement the invention in alternative environments.

The present invention is preferably implemented using software running (that is, executing) in an environment similar to that described above with respect to FIG. 17. In this document, the term "computer program product" is used to generally refer to removable storage device 2018 or a hard disk installed in hard disk drive 2012. These computer program products are means for providing software to computer system 2000.

Computer programs (also called computer control logic) are stored in main memory and/or secondary memory 2010. Computer programs can also be received via communications interface 2024. Such computer programs, when executed, enable the computer system 2000 to perform the features of the present invention as discussed herein. In particular, the computer programs, when executed, enable the processor 2004 to perform the features of the present invention. Accordingly, such computer programs represent controllers of the computer system 2000.

In an embodiment where the invention is implemented using software, the software may be stored in a computer program product and loaded into computer system 2000 using removable storage drive 2014, hard drive 2012, interface 2020, or communications interface 2024. Alternatively, the computer program product may be downloaded to computer system 2000 over communications path 2026. The control logic (software), when executed by the processor 2004, causes the processor 2004 to perform the functions of the invention as described herein.

In another embodiment, the invention is implemented primarily in firmware and/or hardware using, for example, hardware components such as application specific integrated circuits (ASICs). Implementation of a hardware state machine so as to perform the functions described herein will be apparent to persons skilled in the relevant art(s).

7. Examples

According to the present invention, the data structure visualization tool can be implemented using almost any type of data for any data set. For example, census data, DNA data sets, and medical diagnosis and diseases data can be used. This data can be obtained from a variety of sites, including the University of California at Irvine repository (Department of Information and Computer Science), which can be contacted at the following website: http://www.ics.uci.cdu/~mlearn/MLRepositoy.html.

The following examples show cases in which t he data structure visualizer of the present invention can be useful in visualizing a multi-dimensional data set. Each of these examples is associated with a Sample data file provided with Mineset™. By running the decision table inducer, a user can generate the—dtab.dtableviz and -diab.dtableviz.data files described below. In this example operating environment, the data (data) and accompanying schema (schema) files are located in /usr/lib/MineSet/data on the client workstation. The classifier visualization files, which have a -dtab.dtableviz extersion, reside on the client workstations in /usr/lib/MineSet/dtableviz/examples.

A. Example 1: Churn

Figure 21:
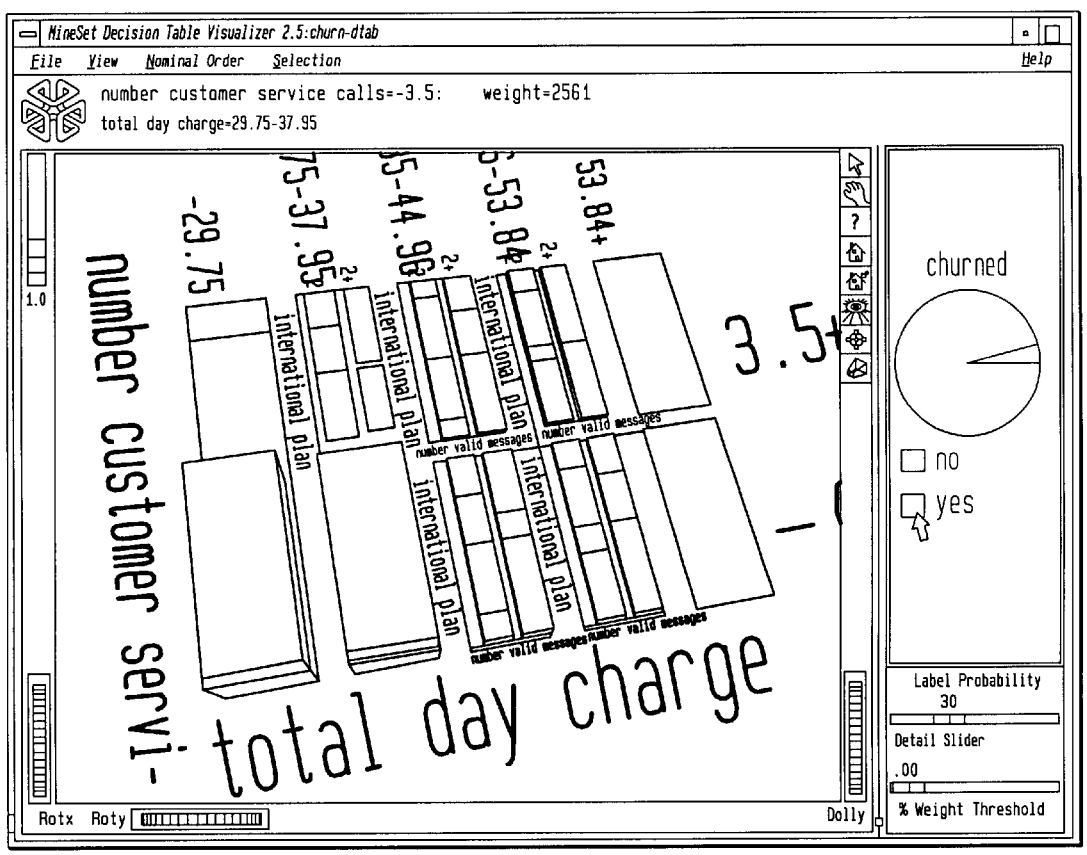
FIG. 21 shows a decision table pane on the left and a label probability pane on the right showing decision table classifier information for an example churn database.

Churn is a term used when a customer leaves one company for another. This example shows what causes customer churn for a telephone company. The data used to generate this example is in/usr/lib/MineSet/data/churn.schema. The file /usr/lib/MineSet/dtableviz/examples/churn-dtab.dtableviz shows the structure of the classifier induced using the attribute churned as the label. The error rate for this classifier is 5.5%. Of the records, 14.3% represent customers who churned. The two attributes selected for the first level of detail were number of_customer_service_calls and total_day_charge. By looking at the distribution over these two attributes, a user can see that churn increases as total day charge increases, except when the total day charge is 29.75, then the churn is high if the number of service calls is >3. About ¾ of the records have total day charge less than 38 and 3 or fewer customer service calls. This example is depicted in FIG. 21.

A user can drill down on regions where its riot clear when a customer chums. FIG. 21 shows drilling down on all cakes in which there was not a clear majority class. The next attributes considered are international_plan and number_of_vmail_messages. Among those with heavy day charge, it appears clear that having the international plan and having few vmail messages correlates well with customer chum. Selecting the lower right cake in each of the drill-down regions, and then brushing with the mouse across the box next to "churned=yes" in the probability pane on the right, shows that only 3.4 percent of the customers in the selected regions churned.

A user can then drill down further on the cake in the upper left of each previous drill-down region. Doing so shows a very similar distribution for each. The consistent pattern shows: high total_evening_charge and high total_ international_charge correlate well with churn. A user can also drill-down another level to see the effect of total-international-calls, but doing so leaves so few records from which to draw conclusions, that a user could not be confident of the distributions seen. If a user is interested in how total_international_calls affects churn and how it correlates with other variables, a user can return to the Tool Manager and explicitly map total_international_calls to a higher level in the decision table hierarchy, and rerun the decision table.

Although "state" is fairly well correlated with churn, it was not selected because the algorithm has a built-in preference for variables with few values. This prevents the algorithm from selecting attributes like social security number which uniquely identify each record, thus yielding high training set accuracy, but are not useful for classifying future unlabeled data.

B. Example 2: Salary Factors

For a data set of working adults, a user may choose the following query: what factors affect salary. Using the method of the present invention, a user can first bin gross_income into two bins, those that earn less that 50,000, and those earning over 50,000. Then, the user can run a MineSet™ classifier to help determine what factors influence salary. The file /usr/lib/MineSet/dtabviz/examples/adult-salary-dtab.dtableviz shows the decision table classifier induced for this query. This file was generated by running the inducer on /usr/lib/MineSet/data/adult.schema with gross_income divided into five bins using user-specified thresholds.

Since the "salary" label is numeric, a continuous spectrum is used to assign colors to each class. Also the classes in the probability pane on the right are not sorted by slice size because they have a numeric order. A color, such as red can be assigned to the highest bin (50,000+).

The two attributes chosen at the top level of the decision table hierarchy are relationship and education_num. The attribute education_num is not particularly useful because it is simply an enumeration of the different educations possible, not years of education. However there is an approximate correlation. the column, education_num, is removed and rerun using feature search (available in MineSet™), the algorithm may not pick education at the top of the hierarchy because it has so many values.

Figure 22:
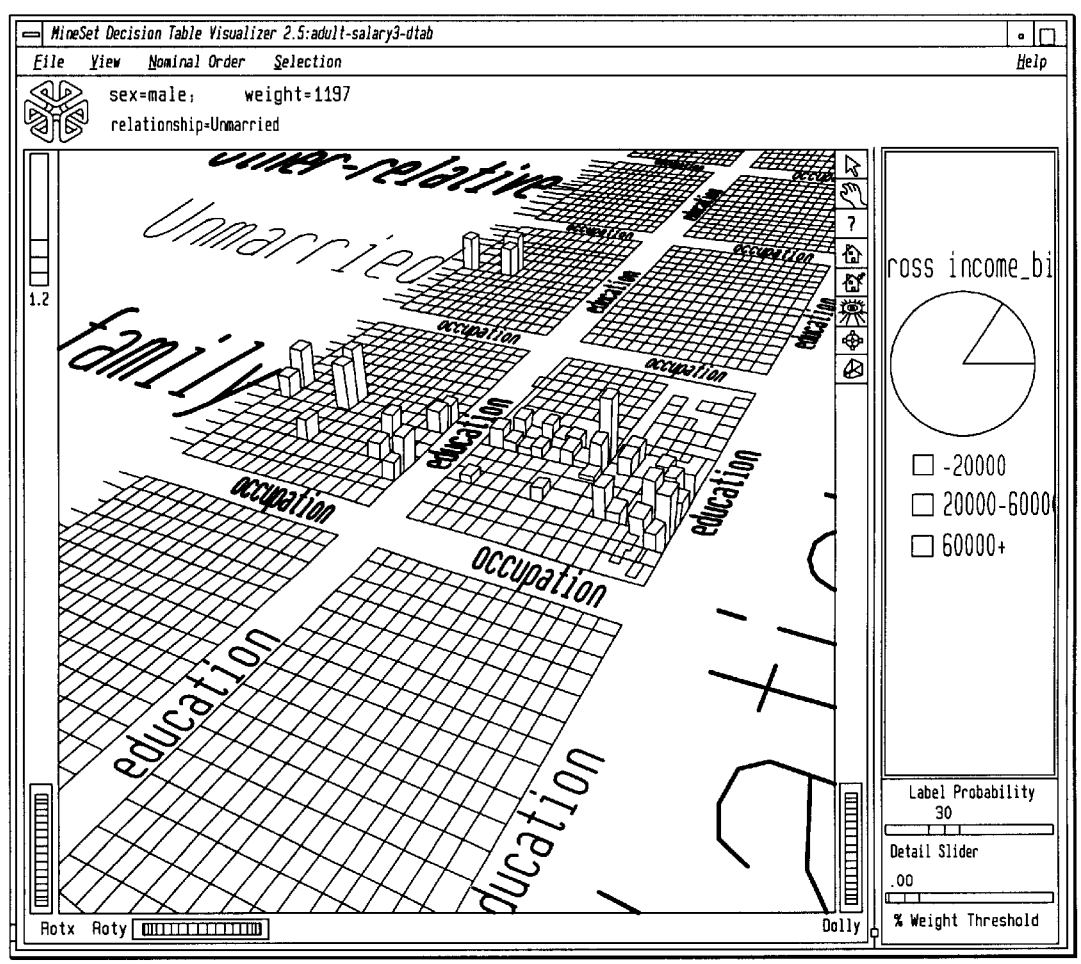
FIG. 22 shows a decision table pane on the left and a label probability pane on the right showing decision table classifier information for an example salary database.

The order of the attributes in this model was selected automatically to increase accuracy. Often a model in which domain knowledge is used to perform the mappings can produce a more useful visualization. Such a model is provided in /usr/lib/MineSet/dtableviz/examples/adult-salary3-dtab. dtableviz, and shown in FIG. 22, where the salary has first been binned into 3 ranges (20000, and 60000 are the thresholds). The attributes mapped at level one are: relationship and sex; level two has education and occupation; and level 3 has hrswk (hours worked per week) and age.

At the top level, "relationship" and "sex" show a strong correlation. Of course one expects that all husbands are male, and wives are female, but in this example, the user can view that this is not the case. For example, by brushing on the cake for male wives, the user sees that there are 3 of them and all their salaries fall in the 20,000–60,000 range. Drilling down on these cakes can reveal more information about these anomalous records. A user can also select these cakes (e.g., by using the left mouse button) and drill through to the underlying data to find the values of all the other fields.

In this example, the user can click the right mouse on the background to perform a drill down globally to the next level. This step replaces every cake with a matrix for every combination of education and occupation. The ordering is the same for every matrix and overall the ordering is by correlation with income. If a user chooses the Nominal Order>by Weight option (discussed above) from the pull-down menu, the overall ordering will be made by record weights. The most popular occupations and education levels will appear in the lower left corner of each matrix. High school grads is the most prevalent education level, and Professional-specialty is the most common occupation, but there are not many high school graduates whose occupation is professional specialty.

A user may wish to drill-down on the most populous cake (male husbands). This operation may take a minute to perform because the decision table visualizer needs to construct all the geometry for the next level of the decision table for this cake. As explained above, by adaptively building a scene graph according to the present invention, the geometry is constructed on demand because the time needed to create it all at the beginning would be excessive and wasteful, especially since the user rarely explorers most of the high detail regions.

C. Example 3: Breast Cancer Diagnosis

The breast cancer data set contains information about females undergoing breast cancer diagnosis. Each record represents a patient with attributes such as cell size, lump thickness, and marginal adhesion. The query (label) is whether the diagnosis is malignant or benign. The file /usr/lib/MineSet/dtableviz/examples/breast-dtab.diableviz shows the structure of the Decision Table Classifier induced for this problem. This file was generated by running the inducer on /usr/lib/MineSet/data/breast.schema.

In the decision table classifier visualizer, mitosis and uniformity of cell shape are shown at the top of the decision table hierarchy. If both attributes have low values at the same time the given sample is 99% likely to be benign. On the other hand, 100% of the training records that had high values for both, were malignant.

When a user drills-down on the four cake, that are ambiguous, the attributes marginal adhesion and bare-nuclei are used to discriminate. There are far fewer records in each cake at this level. As a result there is more noise, and trends are more difficult to detect. High values for both marginal-adhesion and bare-nuclei seem to contribute to malignancy, but its uncertain. In this example, the first value of bare-nuclei is null. The distributions for these null cakes are more suspect than others, so a user can hide these by unchecking View Show Nulls in the Tool Manager.

If a user drills-down globally two more levels of the decision table, the cakes become very small, and there are large regions of the multi-dimensional space which are empty. There are a few tiny regions where many records are clustered. There is one huge spike (100% benign) where all the values are low. This spike alone accounts for about 20% of the data.

D. Example 4: DNA Boundaries

The file/usr/lib/MineSet/dtableviz/examples/dna-dtab.dtableviz shows the structure of the decision table classifier induced for this problem. This file was generated by running the inducer on/usr/lib/MineSet/data/dna.schema. There are 3,186 records in this DNA data set. The domain is drawn from the field of molecular biology. Splice junctions are points on a DNA sequence at which "superfluous" DNA is removed during protein creation. The task is to recognize exon/intron boundaries, referred to as EI sites; intron/exon boundaries, referred to as EE sites; or neither. The FE borders are referred to as "acceptors" and the EI borders are "donors." The records were originally taken from GenBank 64.1 (genbank bio.net). The attributes provide a window of 60 nucleotides. The classification is the middle point of the window, thus providing 30 nudeotides at each side of the junction.

The decision table classifier visualizer shows that at the top level of the decision table, there is a pronounced interaction between left_01 and right_02. Exon/intron is only present if rioht_02=T. Introii/extron is only present if left_01=G. For other values of left_01 and right_01 there are very few splice junctions.

By drilling-down globally to the next level (left_02 and riht_01), among the records where right_02=T and left_01=G, a user can see a pattern which is consistent with the patterns along each edge.

8. Conclusion

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer-implemented method of visualizing a multi-dimensional data set, wherein a data file is generated from the data set, wherein the data file includes a plurality of records, each record having at least one value associated with at least one attribute, the data file arranged in a tabular form having a plurality of rows and columns, wherein each of the rows represents an aggregate of all of the records for each combination of the values of the attributes, and wherein a label corresponds to one of the attributes of the data file, wherein the label has one or more associated label values called classes, comprising the steps of:

(a) creating a multi-dimensional data structure from the data file, wherein said data structure comprises more than one level arranged in a hierarchal manner, wherein a first level corresponds to a first data table representing the data file, wherein each successive level of said data structure comprises an aggregated data table corresponding to at least one fewer attribute than a previous level, and wherein a top hierarchal level comprises a single row representing all of the aggregated data from the data file;

(b) creating a visualization of said data structure, wherein said visualization includes a first view showing a display of computed probability information for at least said top hierarchal level of said data structure, and a second view showing prior probabilities of each label value, wherein said first view does not display all levels of said data structure; and (c) allowing user interaction with said visualization to trigger the computation and display of probability information for levels of said data structure not computed and displayed in said first view.

2. The method of claim 1, wherein the data structure is a decision table classifier, wherein step (a) comprises:

inducing a decision table classifier from the data file, wherein said decision table classifier comprises one or more levels arranged in a hierarchal manner, wherein a first level corresponds to the data file, wherein each successive level of said decision table classifier corresponds to a table of data having two fewer attributes than a previous level, and wherein each level of said decision table classifier includes a first column corresponding to a proportion of said records associated in each class and a second column corresponding to a weight of said records, and wherein a top level comprises a single row representing all of the data from the data file.

3. The method of claim 2, wherein step (b) comprises:

(b) creating a visualization of said decision table. wherein said visualization includes a decision table pane view showing a display of probability information for a pair of said attributes in one of said levels of said decision table classifier, and a label probability pane view showing prior probabilities of each label value.

4. The method of claim 3, wherein said step (a) is performed on a computer system that has implemented on it an inducer to autorratically select attributes to put at each level of said decision table classifier.

5. The method of claim 3, wherein step (b) further comprises:

constructing a scene graph representing said decision table classifier;

displaying a visualization of said scene graph on a computer graphics display.

6. The method of claim 5, further comprising:

constructing said scene graph adaptively.

7. The method of claim 6, wherein said visualization includes one or more graphical representations corresponding to at least one of said levels of said decision table classifier, said graphical representation corresponding to two of the attributes of said decision table, wherein each of said graphical representations are referred to as a cake chart.

8. The method of claim 7, wherein said decision table pane view includes a matrix of one or more of said cake charts, each of said cake charts representing a probability distribution of each of the attribute values at a respective level of said decision table.

9. The method of claim 7, wherein each of said cake charts represents a normalized conditional probability of each of the attribute values at a respective level of said decision table.

10. The method of claim 7, wherein said constructing step comprises:

creating a partial scene graph representative of a portion of said decision table, wherein said partial scene graph comprises a first node, wherein said first node corresponds to said top level of said decision table classifier;

storing said partial scene graph in a memory unit of a computer graphics display; and rendering a first visualization corresponding to said partial scene graph on said computer graphics display, said visualization comprising a cake chart representing said top level of said decision table classifier.

11. The method of claim 10, wherein a viewer desires to observe more detail in said visualization, further comprising:

selecting said cake chart from said first visualization with a graphical user interface device;

generating a next portion of said partial scene graph, said next portion comprising one or more nodes, each node corresponding to a set of records within a next lower level of said decision table classifier; and rendering a visualization corresponding to said next portion of said partial scene graph on said computer graphics display, said computer graphics display permitting said viewer to select one or more cake charts and retrieve two additional attributes corresponding to said selected cake charts for display, said two additional attributes corresponding to a next lower level of said decision table classifier.

12. The method of claim 11, further comprising:

providing a graphical user interface device to permit said viewer to select one or more cake charts and view the corresponding records of the data set corresponding to said selected cake charts for display.

13. The method of claim 11, further comprising:

providing a graphical user interface device to permit said viewer to select one or more cake charts and view a visualization corresponding to a more aggregated level of said decision table corresponding to said selected cake charts for display.

14. The method of claim 5, further comprising the step of:

displaying a controller that permits a user to control the filtering of attributes based on the importance of the attributes to a prediction.

15. The method of claim 4, further comprising the step of:

displaying a filter panel that permits a viewer to filter attribute values based on the number of counts.

16. A system for visualizing a multi-dimensional data set, wherein a data file is generated from the data set, wherein a data structure is created from the data file that includes a plurality of labeled records, each record having at least one attribute value and a corresponding class label, and the data structure being capable of assigning class labels to unlabeled records based on attribute values found in the unlabeled records, wherein the data structure comprises more than one level arranged in a hierarchal manner, comprising:

means for constructing a scene graph representing the data structure;

means for displaying a visualization of said scene graph, wherein said visualization includes a first view showing a display of computed probability information for at least a top hierarchal level of the data structure, and a second view showing prior probabilities of each label value, wherein said first view does not display all levels of the data structure; and means for allowing user interaction with said visualization to trigger the computation and display of probability information for levels of the data structure not displayed in said first view.

17. The system of claim 16, further comprising:

means for adaptively building a scene graph representative of the data structure.

18. The system of said 17, further comprising:

means for inducing a decision table classifier from the data file.

19. A computer program product comprising a computer useable medium having computer program logic recorded thereon for enabling a processor in a computer system to visually represent the structure of a decision table classifier, the decision table classifier being generated from a training set of labeled records, each record having at least one attribute value and a corresponding class label, and the decision table classifier being capable of assigning class labels to unlabeled records based on attribute values found in the unlabeled records, wherein the decision table classifier comprises more than one level arranged in a hierarchical manner, said computer program logic comprising:

means for enabling the processor to construct a scene graph representing the decision table classifier;

means for enabling the processor to display a visualization of said scene graph, wherein said visualization includes a decision table pane view showing a display of computed conditional probability information for a pair of said attributes in at least a top hierarchal level of said decision table classifier, and a label probability pane view showing prior probabilities of each label value. wherein said decision table pane view does not display all levels of said decision table classifier; and means for enabling the processor to allow user interaction with said visualization to trigger the computation and display of probability information for levels of said decision table classifier not displayed in said decision table pane view.

20. An integrated data mining system comprising:

an inducer;

means for configuring said inducer to generate a first data file representing structure of an evidence classifier, a second data file representing structure of a decision-tree classifier, and a third data file representing structure of a decision table classifier, wherein said decision table classifier structure comprises more than one level arranged in a hierarchal manner;

means for visualizing said evidence classifier structure based on said first data file;

means for visualizing said decision-tree classifier structure based on said second data file;

means for visualizing said decision table classifier structure based on said third data file, wherein said means for visualizing said decision table classifier structure includes a view showing a display of computed probability information for at least a top hierarchal level of said decision table classifier structure; and means for allowing user interaction with said visualization to trigger the computation and display of probability information for levels of said decision table classifier structure not displayed in said view.

* * * * *